United States Patent
Prebil et al.

(10) Patent No.: US 10,449,736 B2
(45) Date of Patent: Oct. 22, 2019

(54) APPARATUS FOR FABRICATING THERMOPLASTIC COMPOSITE PARTS

(71) Applicant: The Boeing Company, Chicago, IL (US)

(72) Inventors: Charles R. Prebil, University City, MO (US); James R. Fox, University City, MO (US)

(73) Assignee: The Boeing Company, Chicago, IL (US)

( * ) Notice: Subject to any disclaimer, the term of this patent is extended or adjusted under 35 U.S.C. 154(b) by 856 days.

(21) Appl. No.: 14/538,977

(22) Filed: Nov. 12, 2014

(65) Prior Publication Data
US 2015/0053333 A1 Feb. 26, 2015

Related U.S. Application Data

(60) Continuation-in-part of application No. 13/673,989, filed on Nov. 9, 2012, now Pat. No. 9,511,538, which
(Continued)

(51) Int. Cl.
| | | |
|---|---|---|
| B29C 70/50 | (2006.01) |
| B29C 53/22 | (2006.01) |
| B29C 53/08 | (2006.01) |
| B29K 101/00 | (2006.01) |
| B29L 31/00 | (2006.01) |

(Continued)

(52) U.S. Cl.
CPC ............ *B29C 70/504* (2013.01); *B29C 53/08* (2013.01); *B29C 53/22* (2013.01); *B29C 2791/003* (2013.01); *B29C 2793/00* (2013.01); *B29K 2101/00* (2013.01); *B29K 2101/12* (2013.01); *B29L 2009/00* (2013.01); *B29L 2031/003* (2013.01); *B29L 2031/766* (2013.01); *B64C 1/061* (2013.01); *B64C 2001/0072* (2013.01); *Y02T 50/43* (2013.01); *Y10T 156/101* (2015.01); *Y10T 156/1002* (2015.01); *Y10T 156/1008* (2015.01); *Y10T 156/1028* (2015.01);
(Continued)

(58) Field of Classification Search
CPC ........ B29C 53/08; B29C 53/22; B29C 70/504
USPC ........................................ 156/285, 286, 381
See application file for complete search history.

(56) References Cited

U.S. PATENT DOCUMENTS

| | | |
|---|---|---|
| 2,440,228 A | 4/1948 | Yardeny et al. |
| 2,708,288 A | 5/1955 | Fuller et al. |

(Continued)

FOREIGN PATENT DOCUMENTS

| | | |
|---|---|---|
| BE | 834458 A1 | 2/1976 |
| DE | 1504302 A1 | 4/1969 |

(Continued)

OTHER PUBLICATIONS

Final Office Action, dated Nov. 20, 2017, regarding U.S. Appl. No. 12/711,401, 34 pages.

(Continued)

*Primary Examiner* — Christopher T Schatz
(74) *Attorney, Agent, or Firm* — Yee & Associates, P.C.

(57) ABSTRACT

A system and method for forming a composite part. The apparatus comprises a sleeve that molds a composite material. The sleeve has a first face and a second face. The second face has features to mold the composite material. The first face comprises a first inclined surface having an angle less than about 90 degrees and greater than about 0 degrees.

20 Claims, 22 Drawing Sheets

Related U.S. Application Data is a continuation of application No. 11/584,923, filed on Oct. 20, 2006, now Pat. No. 8,333,858, which is a continuation-in-part of application No. 11/347,122, filed on Feb. 2, 2006, now Pat. No. 7,807,005, application No. 14/538,977, which is a continuation of application No. 14/182,215, filed on Feb. 17, 2014, now Pat. No. 9,545,761, which is a division of application No. 12/398,071, filed on Mar. 4, 2009, now Pat. No. 8,691,137.

(51) Int. Cl.
| | | |
|---|---|---|
| *B29L 9/00* | (2006.01) | |
| *B29K 101/12* | (2006.01) | |
| *B64C 1/06* | (2006.01) | |
| *B64C 1/00* | (2006.01) | |

(52) U.S. Cl.
CPC .... *Y10T 156/1031* (2015.01); *Y10T 156/1043* (2015.01); *Y10T 156/1044* (2015.01)

(56) References Cited

U.S. PATENT DOCUMENTS

| | | |
|---|---|---|
| 4,061,817 A | 12/1977 | Maxel |
| 4,151,031 A | 4/1979 | Goad et al. |
| 4,225,553 A | 9/1980 | Hirota et al. |
| 4,414,266 A | 11/1983 | Archer et al. |
| 4,414,269 A | 11/1983 | Lubowitz et al. |
| 4,462,946 A | 7/1984 | Goldsworthy |
| 4,571,355 A | 2/1986 | Elrod |
| 4,608,220 A | 8/1986 | Caldwell et al. |
| 4,674,712 A | 6/1987 | Whitener et al. |
| 4,749,613 A | 6/1988 | Yamada et al. |
| 4,759,815 A | 7/1988 | Frey |
| 4,818,460 A | 4/1989 | Nied |
| 4,859,267 A * | 8/1989 | Knoll .............. B29C 35/08 156/273.7 |
| 4,913,910 A | 4/1990 | McCarville et al. |
| 4,944,824 A | 7/1990 | Gupta |
| 4,970,044 A | 11/1990 | Kim et al. |
| 4,980,013 A | 12/1990 | Lowery |
| 5,021,283 A | 6/1991 | Takenaka et al. |
| 5,026,447 A | 6/1991 | O'Connor |
| 5,026,514 A | 6/1991 | Hauwiller et al. |
| 5,043,128 A | 8/1991 | Umeda |
| 5,057,175 A | 10/1991 | Ashton |
| 5,064,439 A | 11/1991 | Chang et al. |
| 5,139,407 A | 8/1992 | Kim et al. |
| 5,182,060 A | 1/1993 | Berecz |
| 5,192,330 A | 3/1993 | Chang et al. |
| 5,320,700 A | 6/1994 | Hall et al. |
| 5,413,472 A | 5/1995 | Dietterich et al. |
| 5,681,513 A | 10/1997 | Farley |
| 5,716,487 A | 2/1998 | Sumerak |
| 5,759,325 A | 6/1998 | Davis |
| 5,820,804 A | 10/1998 | Elmaleh |
| 5,958,550 A | 9/1999 | Childress |
| 6,007,917 A | 12/1999 | Weigel et al. |
| 6,024,555 A | 2/2000 | Goodridge et al. |
| 6,114,012 A * | 9/2000 | Amaoka .............. B29C 70/30 244/119 |
| 6,162,314 A | 12/2000 | Kassuelke et al. |
| 6,291,049 B1 | 9/2001 | Kunkel et al. |
| 6,319,346 B1 | 11/2001 | Clark et al. |
| 6,425,969 B1 | 7/2002 | van den Akker |
| 6,689,448 B2 | 2/2004 | George et al. |
| 6,696,009 B2 | 2/2004 | Davis |
| 6,764,057 B2 | 7/2004 | Fanucci et al. |
| 6,869,558 B2 | 3/2005 | Polk, Jr. et al. |
| 7,186,361 B2 | 3/2007 | Kasai et al. |
| 7,191,982 B2 | 3/2007 | Vetillard et al. |
| 7,300,693 B2 | 11/2007 | Albers et al. |
| 7,419,372 B2 | 9/2008 | Kasai et al. |
| 7,431,875 B2 | 10/2008 | Rule |
| 7,513,769 B2 | 4/2009 | Benson et al. |
| 7,670,525 B2 | 3/2010 | Weidmann et al. |
| 7,807,005 B2 | 10/2010 | Rubin et al. |
| 7,871,553 B2 | 1/2011 | Wilkerson et al. |
| 8,151,529 B2 | 4/2012 | Weidmann et al. |
| 8,163,221 B2 | 4/2012 | Suzuki et al. |
| 8,333,858 B2 | 12/2012 | Rubin et al. |
| 8,337,654 B2 | 12/2012 | Schmier, II et al. |
| 8,372,327 B2 | 2/2013 | Matsen et al. |
| 8,425,708 B2 | 4/2013 | Rubin et al. |
| 8,491,745 B2 | 7/2013 | Wilkerson et al. |
| 8,632,653 B2 | 1/2014 | Brown et al. |
| 8,678,809 B2 | 3/2014 | Suzuki et al. |
| 8,691,137 B2 | 4/2014 | Prebil et al. |
| 2003/0168555 A1 | 9/2003 | Livi et al. |
| 2003/0175520 A1 | 9/2003 | Grutta et al. |
| 2004/0009338 A1 | 1/2004 | Jo et al. |
| 2004/0096535 A1 | 5/2004 | Hudeck et al. |
| 2006/0011289 A1 | 1/2006 | Suriano |
| 2007/0012858 A1 | 1/2007 | Callis |
| 2007/0175573 A1 | 8/2007 | Fox et al. |
| 2008/0168619 A1 | 7/2008 | Gonzalez et al. |
| 2008/0277058 A1 | 11/2008 | Schmier, II et al. |
| 2010/0225016 A1* | 9/2010 | Prebil .............. B29C 33/306 264/39 |
| 2010/0319841 A1 | 12/2010 | Rubin et al. |
| 2011/0206906 A1 | 8/2011 | Rubin et al. |
| 2013/0126076 A1 | 5/2013 | Rubin et al. |
| 2013/0202871 A1 | 8/2013 | Hidaka et al. |
| 2014/0014274 A1 | 1/2014 | Wilkerson et al. |

FOREIGN PATENT DOCUMENTS

| | | |
|---|---|---|
| DE | 1629830 A1 | 1/1971 |
| DE | 2165470 A1 | 7/1973 |
| DE | 2647821 A1 | 4/1978 |
| DE | 3709480 A1 | 10/1988 |
| DE | 4017978 A1 | 12/1991 |
| DE | 29711917 U1 | 8/1997 |
| EP | 0024895 A2 | 3/1981 |
| EP | 0277727 A1 | 8/1988 |
| EP | 0317861 A2 | 5/1989 |
| EP | 1336469 A1 | 8/2003 |
| EP | 1504880 A1 | 2/2005 |
| EP | 1614624 A1 | 1/2006 |
| EP | 1666353 A1 | 6/2006 |
| EP | 1813404 A2 | 8/2007 |
| EP | 1995040 A1 | 11/2008 |
| EP | 2014448 A2 | 1/2009 |
| FR | 2384604 A1 | 10/1978 |
| FR | 2587649 A1 | 3/1987 |
| FR | 2888155 A1 | 1/2007 |
| GB | 531357 A | 1/1941 |
| GB | 1157239 A | 7/1969 |
| JP | 2007001298 A | 1/2007 |
| WO | 8302085 A1 | 6/1983 |
| WO | 8810186 A1 | 12/1988 |
| WO | 2007092371 A2 | 8/2007 |
| WO | 2008073164 A2 | 6/2008 |
| WO | 2008094227 A1 | 8/2008 |
| WO | 2008097847 A1 | 8/2008 |
| WO | 2010101744 A2 | 9/2010 |
| WO | 2011106117 A1 | 9/2011 |

OTHER PUBLICATIONS

Office Action, dated Nov. 22, 2017, regarding U.S. Appl. No. 13/419,187, 13 pages.

Canadian Intellectual Property Office Communication, dated Apr. 4, 2017, regarding Application No. 2,790,614, 3 pages.

Office Action, dated May 24, 2018, regarding U.S. Appl. No. 12/711,401, 35 pages.

Office Action, dated Jan. 26, 2018, regarding U.S. Appl. No. 14/602,699, 26 pages.

Final Office Action, dated Mar. 15, 2018, regarding U.S. Appl. No. 13/419,187, 26 pages.

(56) References Cited

OTHER PUBLICATIONS

Office Action, dated Dec. 10, 2018, regarding U.S. Appl. No. 15/831,388, 37 pages.
Notice of allowance, dated Mar. 27, 2015, regarding U.S. Appl. No. 11/699,653, 22 pages.
Office Action dated Mar. 4, 2015, regarding U.S. Appl. No. 13/934,884, 35 pages.
International Search Report dated Oct. 23, 2007, regarding Application No. PCT/US2007/003021, 3 pages.
International Search Report dated Oct. 27, 2008, regarding Application No. PCT/US2007/018611, 3 pages.
International Search Report dated Mar. 31, 2008, regarding Application No. PCT/US2007/022234, 3 pages.
International Search Report dated Jul. 17, 2008, regarding Application No. PCT/US2008/052806, 2 pages.
International Search Report dated Oct. 28, 2010, regarding Application No. PCT/US2010/025176, 5 pages.
International Search Report dated Apr. 28, 2011, regarding Application No. PCT/US2011/022003, 3 pages.
European Patent Office Communication, dated Aug. 9, 2011, regarding Application No. EP08728832.0, 5 pages.
Loos et al., "Thermoplastic Composite Sheet Forming," presented at National Science Foundation Workshop on Composite Sheet Forming, Sep. 2001, 11 pages, accessed Apr. 4, 2012 http://www.mech.northwestern.edu/fac/cao/nsfworkshop/presentations/ns7_loos.pdf.
"Office Action," dated Mar. 12, 2009, regarding U.S. Appl. No. 11/347,122, 17 pages.
"Final Office Action," dated Jul. 9, 2009, regarding U.S. Appl. No. 11/347,122, 8 pages.
"Office Action," dated Nov. 23, 2009, regarding U.S. Appl. No. 11/347,122, 9 pages.
"Final Office Action," dated Jun. 24, 2010, regarding U.S. Appl. No. 11/347,122, 12 pages.
"Notice of Allowance," dated Jul. 21, 2010, regarding U.S. Appl. No. 11/347,122, 6 pages.
"Office Action," dated Apr. 15, 2010, regarding U.S. Appl. No. 11/697,378, 28 pages.
"Final Office Action," dated Oct. 27, 2010, regarding U.S. Appl. No. 11/697,378, 20 pages.
"Office Action," dated Jul. 27, 2011, regarding U.S. Appl. No. 11/697,378, 19 pages.
"Final Office Action," dated Mar. 2, 2012, regarding U.S. Appl. No. 11/697,378, 7 pages.
"Office Action," dated Jun. 18, 2012, regarding U.S. Appl. No. 11/697,378, 20 pages.
"Final Office Action," dated Sep. 19, 2012, regarding U.S. Appl. No. 11/697,378, 10 pages.
"Office Action," dated Feb. 4, 2010, regarding U.S. Appl. No. 11/584,923, 16 pages.
"Final Office Action," dated Jul. 13, 2010, regarding U.S. Appl. No. 11/584,923, 12 pages.
"Office Action," dated Jul. 27, 2011, regarding U.S. Appl. No. 11/584,923, 10 pages.
"Final Office Action," dated Apr. 16, 2012, regarding U.S. Appl. No. 11/584,923, 9 pages.
"Notice of Allowance," dated Jul. 25, 2012, regarding U.S. Appl. No. 11/584,923, 19 pages.
"Office Action," dated Feb. 2, 2010, regarding U.S. Appl. No. 11/699,653, 16 pages.
"Final Office Action," dated Jul. 16, 2010, regarding U.S. Appl. No. 11/699,653, 11 pages.
"Office Action," dated Feb. 16, 2011, regarding U.S. Appl. No. 11/699,653, 13 pages.
"Final Office Action," dated Jul. 7, 2011, regarding U.S. Appl. No. 11/699,653, 14 pages.
"Office Action," dated Oct. 1, 2009, regarding U.S. Appl. No. 11/701,789, 18 pages.
"Final Office Action," dated Mar. 25, 2010, regarding U.S. Appl. No. 11/701,789, 15 pages.
"Office Action," dated Jun. 21, 2010, regarding U.S. Appl. No. 11/701,789, 11 pages.
"Final Office Action," dated Dec. 29, 2010, regarding U.S. Appl. No. 11/701,789, 14 pages.
"Office Action," dated Apr. 20, 2011, regarding U.S. Appl. No. 11/701,789, 15 pages.
"Final Office Action," dated Oct. 12, 2011, regarding U.S. Appl. No. 11/701,789, 17 pages.
"Office Action," dated Jul. 5, 2012, regarding U.S. Appl. No. 11/701,789, 30 pages.
"Office Action," dated Sep. 11, 2009, regarding U.S. Appl. No. 11/859,057, 11 pages.
"Final Office Action," dated Mar. 23, 2010, regarding U.S. Appl. No. 11/859,057, 10 pages.
"Notice of Allowance," dated Oct. 4, 2010, regarding U.S. Appl. No. 11/859,057, 9 pages.
"Office Action," dated Jan. 24, 2011, regarding U.S. Appl. No. 12/398,071, 15 pages.
"Final Office Action," dated Jun. 8, 2011, regarding U.S. Appl. No. 12/398,071, 9 pages.
"Office Action," dated Dec. 16, 2011, regarding U.S. Appl. No. 12/711,401, 22 pages.
"Final Office Action," dated Jun. 15, 2012, regarding U.S. Appl. No. 12/711,401, 33 pages.
Cai et al., "Consolidation Techniques and Cure Control," In: Handbook of Composites, Second Edition, Peters (Ed.), Chapman & Hall, London, 1998, pp. 576-577.
"Final Office Action," dated Dec. 13, 2012, regarding U.S. Appl. No. 11/701,789, 9 pages.
"Office Action," dated Feb. 20, 2013, regarding U.S. Appl. No. 12/398,071, 24 pages.
"Office Action," dated Jan. 18, 2013 regarding U.S. Appl. No. 12/711,401, 32 pages.
"Office Action," dated Feb. 14, 2014, regarding U.S. Appl. No. 11/699,653, 43 pages.
"Notice of Allowance," dated Nov. 20, 2013, regarding U.S. Appl. No. 12/398,071, 9 pages.
"Final Office Action," dated Mar. 27, 2014, regarding U.S. Appl. No. 13/673,989, 12 pages.
Prebil et al., "Method for Fabricating Tapered Thermoplastic Composite Parts," U.S. Appl. No. 13/419,187, filed Mar. 13, 2012, 67 pages.
Notices of Reasons for Rejection and English Translation, dated Jul. 14, 2015, regarding Japanese Patent Application No. 2012-555007, 5 pages.
Final Office Action, dated Aug. 25, 2015, regarding U.S. Appl. No. 13/419,187, 21 pages.
Final Office Action dated Jul. 10, 2015, regarding U.S. Appl. No. 13/934,884, 17 pages.
Office Action, dated Jun. 25, 2015, regarding U.S. Appl. No. 14/182,215, 34 pages.
Final Office Action, dated Oct. 19, 2015, regarding U.S. Appl. No. 14/182,215, 12 pages.
Office Action, dated May 6, 2016, regarding U.S. Appl. No. 13/673,989, 20 pages.
Final Office Action, dated Feb. 9, 2017, regarding U.S. Appl. No. 12/711,401, 28 pages.
Office Action, dated Nov. 21, 2016, regarding U.S. Appl. No. 13/419,187, 31 pages.
Office Action, dated Dec. 29, 2016, regarding U.S. Appl. No. 14/602,699, 18 pages.
"Office Action," dated Jan. 22, 2014, regarding U.S. Appl. No. 13/673,989, 30 pages.
"Office Action," dated Jun. 6, 2014, regarding U.S Appl. No. 13/673,989, 11 pages.
"Office Action," dated Jul. 18, 2014, regarding U.S. Appl. No. 13/419,187, 44 pages.
Canadian Intellectual Property Office Communication, dated Jul. 22, 2014, regarding Application No. 2,673,448, 2 pages.
Office Action, dated Jun. 13, 2017, regarding U.S. Appl. No. 12/111,401, 14 pages.
Final Office Action, dated Jun. 8, 2017, regarding U.S. Appl. No. 14/602,699, 20 pages.

(56) References Cited

OTHER PUBLICATIONS

Final Office Action, dated Jan. 2, 2015, regarding U.S. Appl. No. 13/673,989, 19 pages.
Notice of Allowance, dated Jul. 7, 2016, regarding U.S. Appl. No. 13/673,989, 9 pages.
Notice of Allowance, dated Sep. 8, 2016, regarding U.S. Appl. No. 14/182,215, 15 pages.
Office Action, dated Sep. 6, 2016, regarding U.S. Appl. No. 12/711,401, 27 pages.
Final Office Action, dated Aug. 8, 2016, regarding U.S. Appl. No. 14/602,699, 17 pages.
Office Action, dated Mar. 4, 2016, regarding U.S. Appl. No. 14/602,699, 48 pages.

* cited by examiner

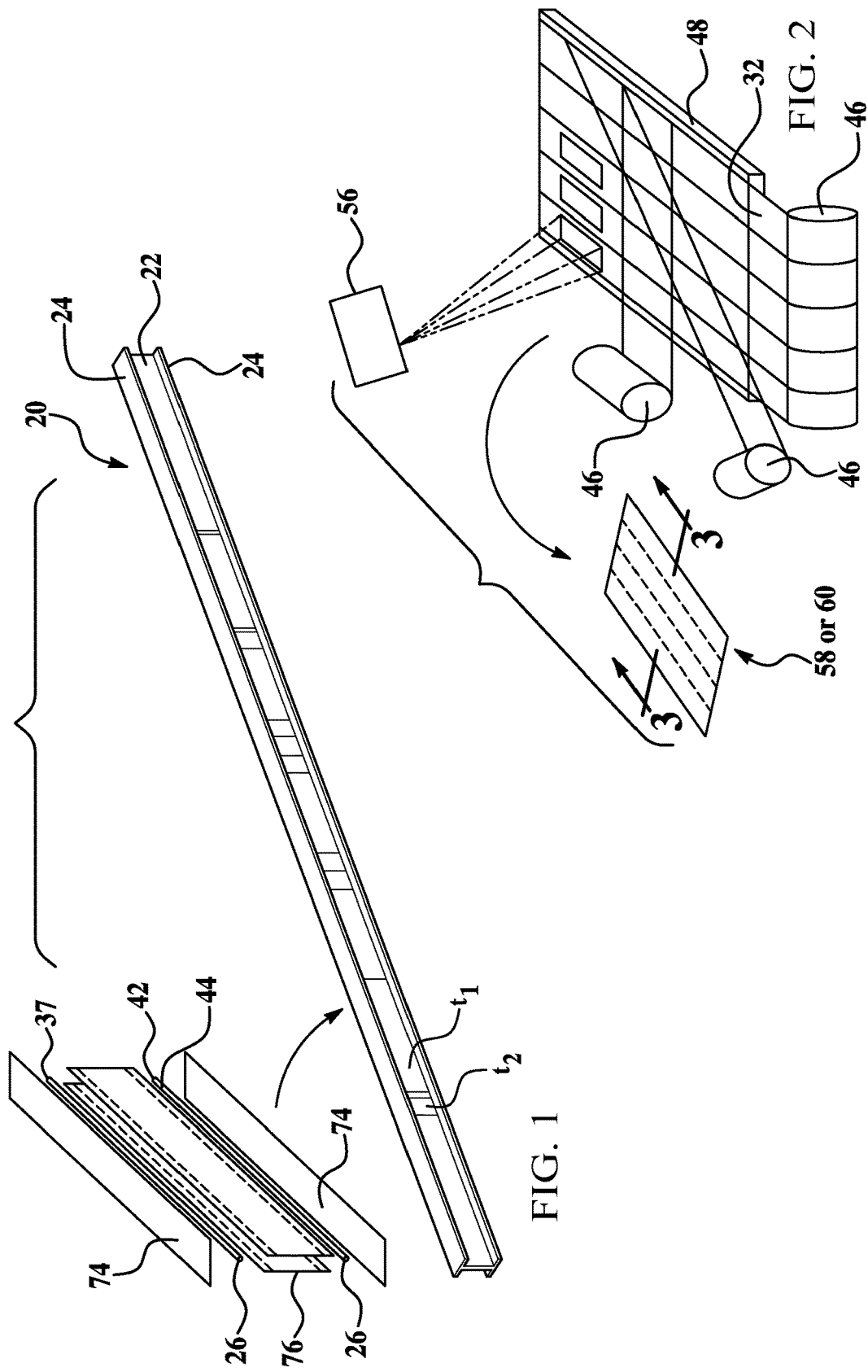

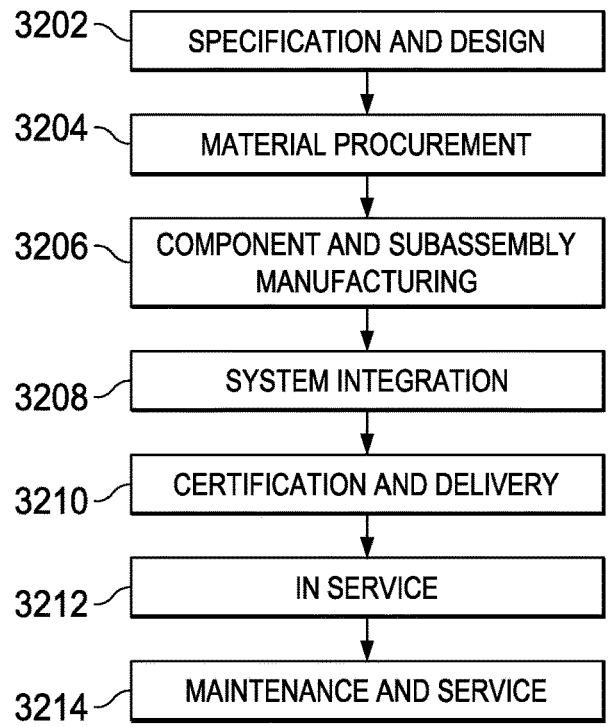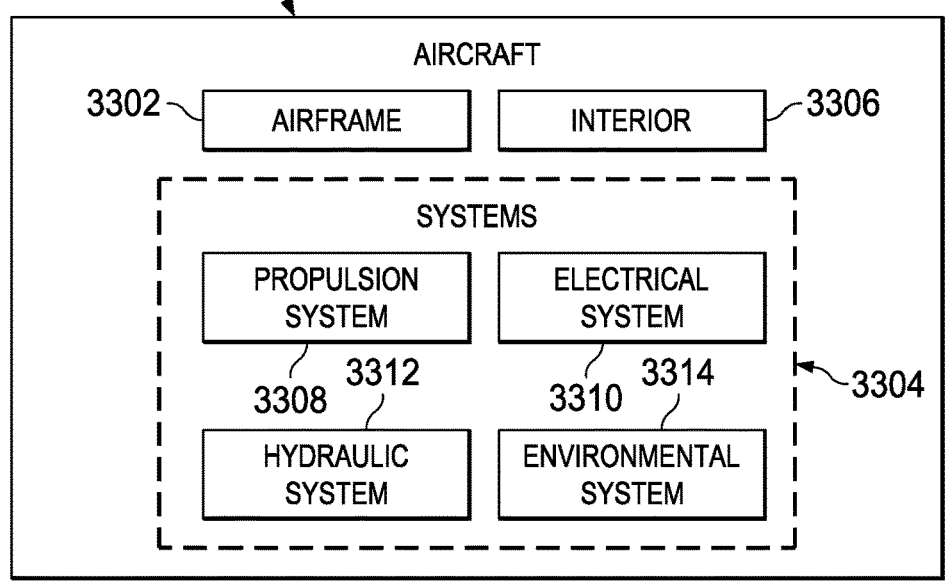

APPARATUS FOR FABRICATING THERMOPLASTIC COMPOSITE PARTS

CROSS REFERENCE TO RELATED APPLICATIONS

This application is a continuation in part of U.S. patent application Ser. No. 13/673,989, filed on Nov. 9, 2012, now U.S. Pat. No. 9,511,538, issued Dec. 6, 2016, which is a continuation application of U.S. patent application Ser. No. 11/584,923 filed Oct. 20, 2006, now U.S. Pat. No. 8,333,858, issued Dec. 18, 2012, which is a continuation-in-part application of U.S. patent application Ser. No. 11/347,122, filed Feb. 2, 2006, now U.S. Pat. No. 7,807,005, issued Oct. 5, 2010. This application is also a continuation in part of U.S. patent application Ser. No. 14/182,215, filed on Feb. 17, 2014, now U.S. Pat. No. 9,545,761, issued Jan. 17, 2017, which is a divisional application of U.S. patent application Ser. No. 12/398,071, filed on Mar. 4, 2009, now U.S. Pat. No. 8,691,137, issued Apr. 8, 2014, in which the entire disclosures of all are incorporated by reference herein.

BACKGROUND OF THE INVENTION

1. Field

The present disclosure generally relates to composite structures and, in particular, to the fabrication of composite structures. Still more particularly, the present disclosure relates to a method and apparatus for fabricating thermoplastic composite parts.

2. Background

Aircraft are being designed and manufactured with greater and greater percentages of composite materials. Composite materials are used in aircraft to decrease the weight of the aircraft. This decreased weight improves performance features such as payload capacities and fuel efficiencies. Further, composite materials provide longer service life for various components in an aircraft.

Composite materials are long lasting, lightweight materials created by combining two or more functional components. For example, a composite material may include reinforcing fibers bound in polymer resin matrix. The fibers may be unidirectional or may take the form of a woven cloth or fabric. Resins used in composite materials may include thermoplastic or thermoset resins. A thermoplastic material may become soft upon heating and may harden upon cooling. A thermoplastic material may be able to be repeatedly heated and cooled. A thermoset material may become hard after being heated to a curing temperature. In thermoset composites, fibers and resins are arranged and cured to form a composite material. Thermoset materials may not become soft upon being heated again.

Numerous processes exist for the fabrication of Thermoplastic composite (TPC) laminates of constant thickness and straight length. In addition to non-continuous processes such as pressing, stamping and autoclave forming, there are continuous processes such as extrusion, pultrusion, roll forming, and compression molding. Although these latter processes are capable of producing parts in continuous lengths, they lack the ability to produce parts of varying thickness that are needed for lightweight aerospace structures and other structures where weight is of particular importance. Moreover, the processes mentioned above are not capable of producing parts that have curvature along their length.

There thus exists a need to provide a new method that is capable of fabricating curved TPC laminates with tailored thicknesses in a continuous process. Preferably, such a method should be a low cost method and take advantage of automated equipment where possible.

Further, during continuous compression molding, it may be desirable to have substantially even pressure distribution on material. Continuous compression molding applying uneven pressure distribution on material may result in less than desired quality. For example, applying uneven pressure may result in a product with non-uniform thickness, porosity, or other inconsistencies. Thus, there exists a need to provide a method and apparatus capable of providing substantially even pressure distribution to thermoplastic laminates during continuous compression molding.

SUMMARY

An illustrative embodiment of the present disclosure provides an apparatus. The apparatus comprises a sleeve that molds a composite material. The sleeve has a first face and a second face. The second face has features to mold the composite material. The first face comprises a first inclined surface having an angle less than about 90 degrees and greater than about 0 degrees.

A further illustrative embodiment of the present disclosure provides an apparatus. The apparatus comprises an inclined die having a first face, an inclined sleeve having a second face in engageable alignment with the inclined die, and a shim positioned between the first face of the inclined die and the second face of the inclined sleeve.

Another illustrative embodiment of the present disclosure provides an apparatus. The apparatus comprises a sleeve located between a continuous compression molding die and a composite charge. The sleeve has a first face that forms a cavity. The first face comprises a first inclined surface having an angle less than about 90 degrees and greater than about 0 degrees which conforms to a second inclined surface of the continuous compression molding die.

A yet further illustrative embodiment of the present disclosure provides a method. The method places a multiple ply stack relative to an inclined sleeve such that at least a portion of the multiple ply stack contacts at least a portion of a first face of the inclined sleeve. The method may also feed the multiple ply stack and the inclined sleeve into a continuous compression molding machine. The method may also lower an inclined die of the continuous compression molding machine to engage a second face of the inclined sleeve.

Another illustrative embodiment of the present disclosure provides a method. The method installs an inclined sleeve over an inclined die such that a first inclined surface of the inclined sleeve engages a second inclined surface of the inclined die. The first inclined surface has an angle less than about 90 degrees and greater than about 0 degrees. The method may also place at least one shim between the inclined sleeve and the inclined die. The method may secure the inclined sleeve to the inclined die.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 1 is an exploded view and perspective view of a thermoplastic composite laminate formed in accordance with a preferred embodiment of the invention;

FIG. 2 is a perspective view of a conveyor table used to form a tailored multi-layer stack in accordance with an illustrative embodiment;

FIG. 32 is an illustration of a block diagram of an aircraft manufacturing and service method in accordance with an illustrative embodiment; and FIG. 33 is an illustration of a block diagram of an aircraft in which an illustrative embodiment may be implemented.

DETAILED DESCRIPTION OF THE INVENTION

Figure 3:
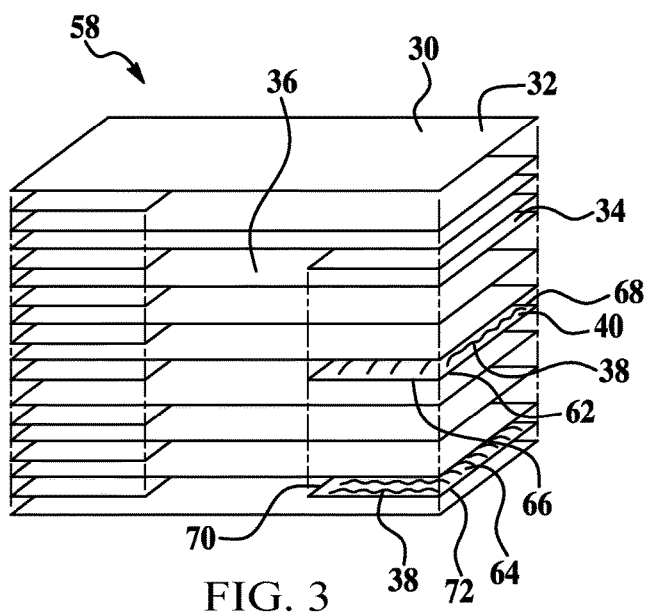
FIG. 3 is a perspective view of one example of a tailored multi-layer stack formed in FIG. 2 in accordance with an illustrative embodiment.

The invention provides a novel fabrication method of forming a thermoplastic composite ("TPC") laminate material with tailored and varying thicknesses in a continuous process. The invention finds applicable uses in a wide variety of potential applications, including for example, in the aerospace industry. The preferred method of the invention is ideally suited for forming thermoplastic composite stiffened members in the supporting framework of an aircraft fuselage. Potential examples of thermoplastic composite stiffened members include but are not limited to fuselage skins, wing skins, control surfaces, door panels and access panels. Stiffening members include but are not limited to keel beams, floor beams, and deck beams. For illustrative purposes only, the invention will initially be described in reference to forming a thermoplastic composite floor beam 20 for use in a commercial aircraft fuselage. However, while an I-section is shown, other stiffened member geometries such as Z-section, U-section, T-section, etc. will also be later described, including those having curvature along their length.

Referring now to FIG. 1, a thermoplastic composite laminate, here a thermoplastic composite laminate floor beam 20 having tailored and varying thickness regions t1 and t2 is illustrated as having a web region 22 coupled at either end to a respective pair of cap regions 24. The web region 22 and pair of cap regions 24 are formed as a single integrated laminate structure by consolidating a pair of non-uniform thickness tacked multi-layer ply sheet stacks 76 with a pair of thermoplastic composite filler nuggets 26 and further with a pair of uniform thickness tacked multi-layer ply sheet stacks 74. Although sheet stack 76 is shown as comprising 2 plies, it is to be understood that either of the sheet stacks 74 and 76 may include any number of plies, depending on the application. It will also be understood that cap regions 24, which are shown in FIG. 1 as having a uniform thickness and one ply, may similarly be provided with regions of varying thicknesses and/or a plurality of plies.

In alternative versions (not shown), a thermoplastic composite laminate such as the floor beam 20 may alternatively be formed by consolidating one or more uniform or non-uniform tacked multi-layer ply sheets 74,76 with either one or more single ply (shown as 32 in FIGS. 2 and 3) of a thermoplastic composite material 30, one or more partial ply (shown as 34 in FIG. 3) of a thermoplastic material 30, or one or more uniform or non-uniform thickness tacked multi-layer tacked stacks 74, 76, and any combination thereof, in a similar method to that described herein. Further, one or more filler nuggets 26 may also be used in combination thereof to form further alternative versions of the thermoplastic composite laminate 20. The method for forming the thermoplastic composite floor beam 20 as shown in FIG. 1 is described below in more detail in conjunction with FIGS. 2-6.

The thermoplastic materials 30 used in plies 32, 34 include thermoplastic matrix polymers (shown as 40 in FIG. 3) such as polyetheretherketone ("PEEK"), polyetherketoneketone ("PEKK"), polyphenylsulfone ("PPS"), polyetherimide ("PEI") preferably reinforced with a fibrous component (shown as 38 in FIG. 3) such as glass (s-type or e-type) or carbon fiber. The fibers 38 within each ply 32, 34 of the thermoplastic materials 30 may be oriented in a unidirectional or non-uniform arrangement, depending upon the particular application. As one of ordinary skill recognizes, the relative types, thicknesses, amounts of fibers 38 within the matrix resin 40, as well as the type of matrix resin utilized in each ply 32, 34 may vary greatly, based on numerous factors, including cost and the ultimate desired physical and mechanical properties of the thermoplastic laminate composite 20. Further, the relative orientation of the unidirectional fibers in one ply 32, 34 relative to another ply 32, 34 may also affect the mechanical properties of the thermoplastic composite laminate 20.

The nuggets 26 are preferably formed from a thermoplastic material 37 that is compatible with the thermoplastic material 30 via extrusion or other well-known forming process. Preferably the matrix resin composition 42 of the nuggets 26 is the same as the matrix resin composition 40 of the materials 30. In addition, the filler nuggets 26 may utilize fibers 44 similar to the fibers 38 contained within the thermoplastic material 30.

Referring now to the logic flow diagram (FIG. 6) and the processing diagrams (FIGS. 2-5), the method for forming the TPC laminate floor beam 20 of FIG. 1 begins in Step 150 by providing preformed plies 32, 34 of the thermoplastic materials 30 and preformed filler nuggets 26 each retained on roller 46 or other retention devices. Next, in Step 160, multiple plies 32, 34 of the thermoplastic materials 30 are stacked in a desired configuration to form either a non-uniform thickness or uniform thickness untacked multi-layer ply sheet stack 58 or 60 using either a hand lay-up or automated process.

In the automated process, as shown in FIG. 2, a plurality of plies 32 or 34 (FIG. 3) of the thermoplastic material 30 are unrolled from rollers 46 onto a conveyor table 48 to form a collated multi-layer non-uniform thickness or uniform thickness multi-layer ply stack 58 or 60. The rollers 46 may be situated at one end, or along the sides of the conveyor table 48 to lay respective ply layers 32, 34 at a particular orientation with respect to another adjacent layer 32, 34. Thus, for example, a lower layer of a full ply 32 may be laid having unidirectional fibers 38 extending in one direction, while the next respective upper full ply 32 may have unidirectional fibers 38 laid in another direction (for example, at 45 or 90 degrees relative to the underlying ply 32). A laser projector 56 located above the conveyor table 48 ensures proper location of the local or partial plies 34 and/or pockets 36 relative to the full plies 32.

An example of an untacked, non-uniform thickness multi-layer sheet stack 58 made according to the process of FIG. 2 is shown in FIG. 3, which shows various full and partial plies 32, 34 and further showing pockets 36 created between plies 32, 34. Moreover, FIG. 3 shows partial plies 62, 64 having unidirectional fibers 38 laid in a 90-degree relative orientation with respect to one another, here showing partial ply 62 laid in a first orientation (fibers 38 extending from front 66 to back 68), while partial ply 64 is laid in a different orientation (fibers 38 extending from side 70 to side 72). Of course, while not shown, plies may have fibers 38 at other relative orientations to one another, ranging from perpendicular to one another (i.e. a 0/90 arrangement) to parallel with one another (i.e. a 0/0 arrangement) and every conceivable angle therebetween (including, for example a 0/30 orientation, a 0/60, 0, 45, 90 orientation etc.).

Next, in Step 170, some or all of various plies 32, 34 of the untacked stacks 58, 60 formed in FIG. 2 may be tacked together at various predetermined locations to form either a uniform or non-uniform thickness tacked multi-layer ply sheet stack 74, 76. Preferably, the stacks 58, 60 are tacked together using a soldering iron or ultrasonic welder (not shown) to form the respective stack 74, 76, although other devices used to couple together various plies 32, 34 of thermoplastic materials known to those of ordinary skill are also specifically contemplated. The amount and location of tacking among the plies 32, 34 is dependent upon numerous factors, including but not limited to the number and location of the various plies 32, 34 and pockets 64. Moreover, the amount of tacking should be sufficient to form a substantially integrated tacked stack 74, 76 that can be transported as a single part. In Step 175, the tacked stacks 74, 76 may then be cut into smaller pieces, or are ready for use in forming the thermoplastic composite laminates such as floor beam 20 of FIG. 1.

Next, in Step 180, a combination of at least one uniform or non-uniform thickness tacked stack 74, 76, and at least one of either a non-uniform thickness tacked stack 76, a uniform thickness tacked stack 74, or a single ply 32, and optionally at least one filler nugget 26 of thermoplastic material 30, 37 are fused together in a consolidation structure 78 to form a single integrated thermoplastic composite laminate such as floor beam 20. One preferred consolidation structure 78 specifically designed to form the thermoplastic composite laminate floor beam 20 of FIG. 1 is illustrated in FIGS. 4 and 5 below.

Figure 4:
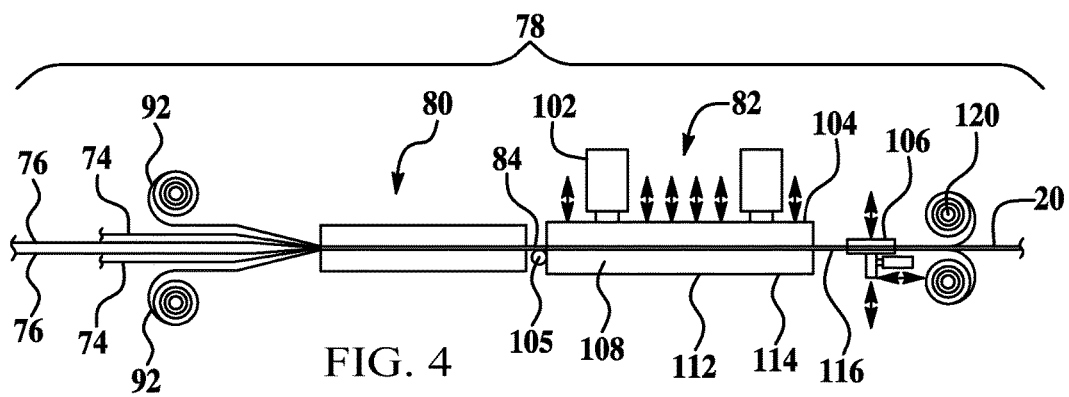
FIG. 4 is a view of a pre-forming zone and a consolidating zone of a consolidation structure used to form the thermoplastic composite laminate of FIG. 1 in accordance with an illustrative embodiment.
Figure 5:
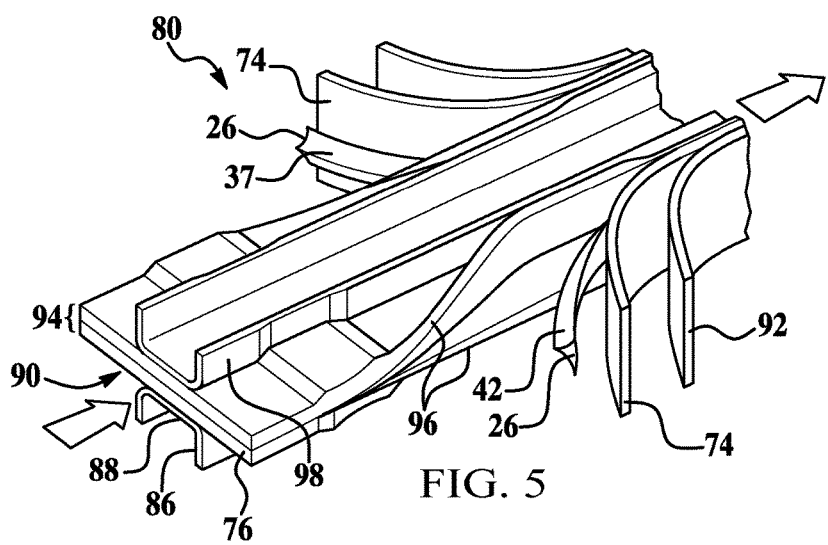
FIG. 5 is a perspective view of the pre-forming zone of the consolidation structure of FIG. 4 in accordance with an illustrative embodiment.
Figure 6:
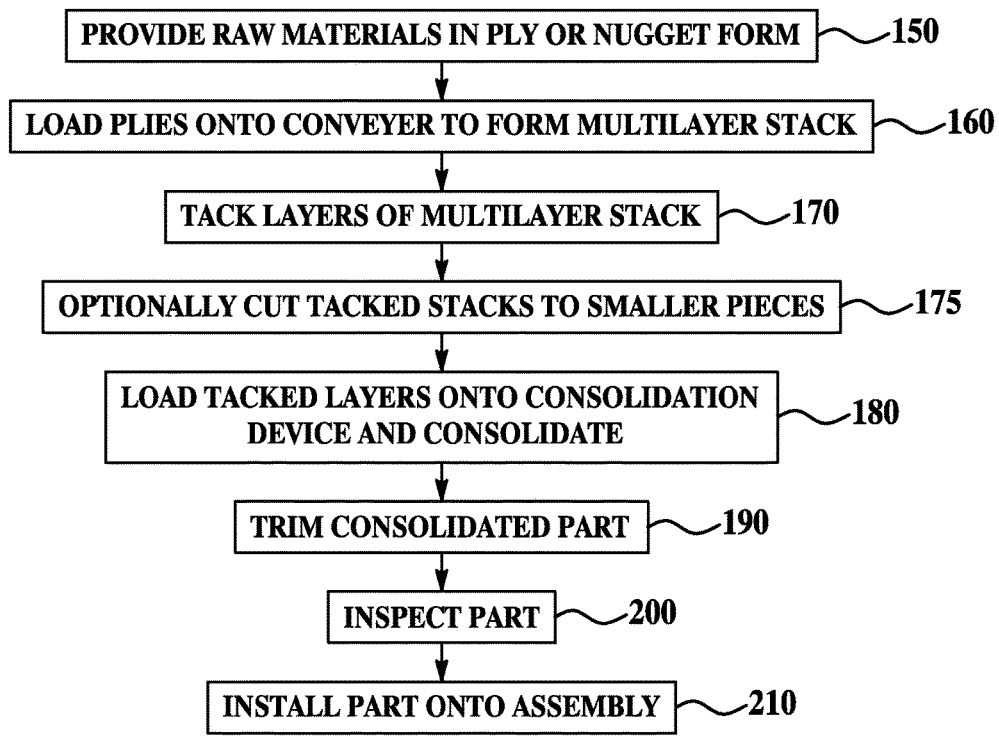
FIG. 6 is a logic flow diagram describing the preferred method for forming the thermoplastic composite laminate of FIG. 1 in accordance with FIGS. 2-5 in accordance with an illustrative embodiment.
Figure 7A:
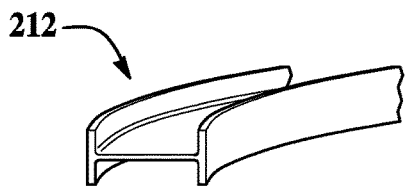
FIGS. 7A-7F are perspective views representing examples of curved, thermoplastic composite laminate parts formed in accordance with the method of the invention.
Figure 7B:
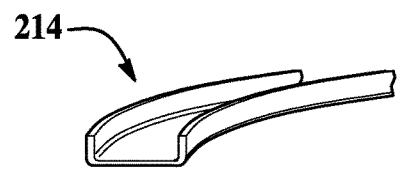
Figure 7C:
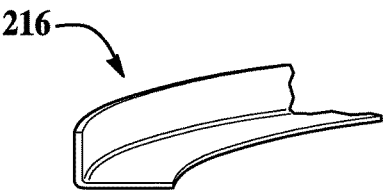
Figure 7D:
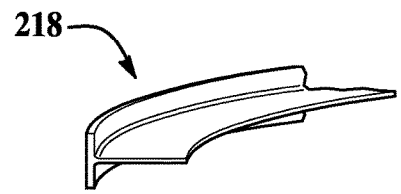
Figure 7E:
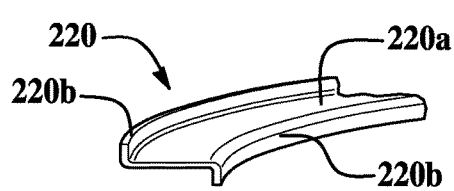
Figure 7F:
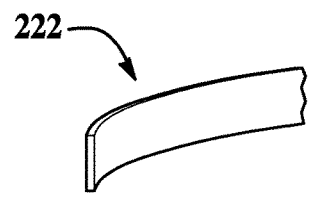

Referring now to FIGS. 4 and 5, the consolidation structure 78 may include a pre-forming zone 80 and a consolidation zone 82. In the pre-forming zone 80, a combination of at least one uniform or non-uniform thickness tacked stack 74, 76, optionally at least one filler nugget 26, and at least one of either a non-uniform thickness tacked stack 76, a uniform thickness tacked stack 74, or a single ply 32, FIGS. 2 and 3, of thermoplastic material are loaded in their proper orientations in a continuous process and preformed to the desired shape at an elevated temperature to form the preformed part 84. The preformed part 84 then exits the pre-forming zone 80 and enters the consolidation zone 82, wherein it is consolidated to form a single, integrated thermoplastic composite laminate such as floor beam 20 as described in FIG. 1 above. The elevated temperature used in pre-forming the part should be sufficiently high to cause softening of the tacked stacks 74, 76 or the single ply 32 so that the layers may be bent during the pre-forming process. However, the elevated temperature should be below a temperature at which the polymeric component of the matrix resin 40, 42 has the consistency of a viscous liquid.

Referring now to FIG. 5, the pre-forming zone 80 of the consolidation structure 78 includes a pair of U-shaped tooling channels 86 having a central portion 88 separated by a gap 90 and a pair of sidetooling sheet members 92. Sheet members 92 may also be called mandrels 92. Preferably, the channels 86 and side-tooling sheet members 92 are formed of materials such as stainless steel and the like, that are capable of handling repetitious, high-heat cycles.

A first pair 94 of tacked stacks 74 or 76 is introduced between the respective central portions 88 and within the gap 90 of the U-shaped channels 86. At the same time, an optional filler nugget 26 and either the additional tacked stack 74 or 76 or ply 32, are introduced along each flange 96 of the first pair 94 and within the respective side-tooling member 92. For the purposes of description in the following paragraphs with respect to the illustrations of FIGS. 4 and 5, the non-uniform thickness tacked stack 76 is shown as the first pair 94 introduced within the gap 90. The uniform thickness tacked stack 74 is shown being introduced at a position between the outer portion 98 of the U-shaped channels 86 and respective side-tooling member 92. Further, the ply layer 32 is not depicted in this description. While not shown, the U-shaped channels 86 include ramps and other features designed to match the laminate thickness variations (corresponding to t1 and t2 in FIG. 1) of the particular material (here the first pair 94 of non-uniform tacked stacks 76).

As the tacked stacks 74, 76 and nuggets 26 move through the pre-forming zone 80 towards the consolidation zone 82, the flanges 96 of the first pair 94 of non-uniform thickness tacked stacks 76 on either side of the u-shaped channel 86 are bent outwardly under heat and pressure away from each other towards the respective outer portions 98 of the U-shaped channel 86. The flanges 96 are therefore coupled flat against the inner side of the uniform or non-uniform thickness tacked stacks 76, with the nuggets 26 located between the flanges 96 and the respective inner end of the uniform or non-uniform thickness tacked stacks 76. The heat within the pre-forming zone 80 is elevated sufficiently to allow deformation of the flanges 96 of the non-uniform thickness tacked stacks 76, but is below the temperature in which the polymeric component of the matrix resin 40, 42 of the respective stacks 74, 76 and nuggets 26 has the consistency of a viscous liquid. Bending of the flanges 96 is initiated by pressure applied to the flange 96 by external forming devices such as rollers (not shown). The side-tooling sheet members 92 squeeze the tacked stack 74 inwardly against the flange 96, causing additional pressure to be applied to the flange 96 which aids in bending the flange 96. The preformed part 84 is then ready to move to the consolidation zone 82.

Figure 16:
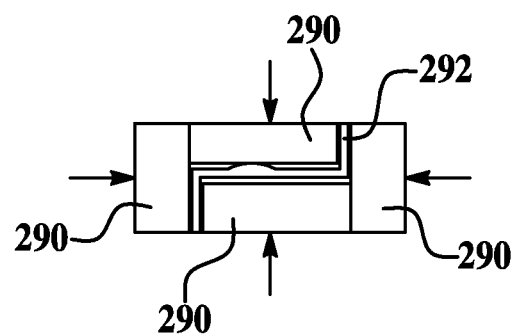
FIG. 16 is a sectional view through the press, showing the dies compressing the preformed part using the consolidation tooling in accordance with an illustrative embodiment.

As best shown in FIG. 4, the preformed part 84 enters a separate or connected consolidating structure 102 within consolidation zone 82 on guide roller 105. The consolidating structure 102 includes a plurality of standardized tooling dies generally indicated at 104 that are individually mated with the outer surfaces of the U-shaped channels 86 and side-tooling sheet members 92. Additional details of the tooling dies 104 will be discussed later with reference to FIGS. 13 and 16. This commonality of the surfaces between the standardized dies 104 of the consolidating structure 102 and the outer surfaces of the channels 86 and sheet members 92 eliminates the need for part-specific, costly matched dies as well as eliminates start up times between different pre-formed parts having different ply configurations.

The consolidating structure 102 has a pulsating structure 106 that incrementally moves the preformed part 84 forward within the consolidation zone 82 and away from the pre-forming zone 80. As the part 84 moves forward, the part first enters a heating zone 108 that heats the part to a temperature which allows the free flow of the polymeric component of the matrix resin 40, 42 of the stacks 74, 76 and nuggets 26. Next, the part 84 moves forward to a pressing zone 112, wherein standardized dies 104 are brought down collectively or individually at a predefined force (pressure) sufficient to consolidate (i.e. allow free flow of the matrix resin) the various plies 32, 34 of the tacked stacks 74, 76 and nuggets 26 into its desired shape and thickness, here forming the web region 22 and pair of cap regions 24 of the floor beam 20. Each die 104 is formed having a plurality of different temperature zones with insulators. The dies 104 do not actually contact the part 84, but contact the outer surfaces of the U-shaped channels 86 and sidetooling sheet members 92 opposite the part 84. Thus, the respective inner surfaces of the channels 86, 92 compress against the portion of the part 84. The compression may occur wherein all of the dies 104 compress in one independent yet coordinated step. The dies 104 are opened, and the part 84 is advanced within the consolidating zone 102 away from the pre-forming zone 80. The dies 104 are then closed again, allowing a portion of the part 84 to be compressed under force within a different temperature zone. The process is repeated for each temperature zone of the die 104 as the part 84 is incrementally advanced along the guide rollers 105 towards the cooling zone 114.

The formed and shaped part 84 then enters a cooling zone 114, which is separated from the pressing zone 112, wherein the temperature is brought below the free flowing temperature of the matrix resin 40, 42, thereby causing the fused or consolidated part to harden to its ultimate pressed shape 116. The pressed part 116 then exits the consolidating structure 102, wherein the side sheet members 92 are re-rolled onto rollers 120 as scrap. While not shown, the consolidating structure 102 may have additional parts or devices that can introduce shapes or features into the pressed shape 116.

One preferred consolidating zone structure 102 that may be utilized is the so-called continuous compression molding ("CCM") process as described in German Patent Application Publication No. 4017978, published on Sep. 30, 1993, and herein incorporated by reference. However, other molding processes known to those of ordinary skill in the art are specifically contemplated by the invention, including but not limited to pultrusion or roll forming.

Next, in Step 190, the pressed part 116 is trimmed or otherwise post-processed to its desired final shape to form the thermoplastic composite laminate 20. In Step 200, the laminate 20 is inspected visually, preferably using ultrasonic non-destructive inspection techniques, or by other means to confirm that the laminate 20 is correctly shaped and does not contain any visual or other defects. After inspection, in Step 210, the laminate 20 such as the thermoplastic composite floor beam 20 may be installed onto its assembly. In the case of the floor beam 20, it is introduced within an aircraft fuselage.

While the invention is described in terms of forming a thermoplastic composite floor beam 20 having essentially an I-beam shape, other potential shapes are specifically contemplated by the invention. This includes thermoplastic composite laminates having an L-shape, a C-shape, a T-shape, or even a flat panel shape in which thickness transitions may occur in any section of the part. These alternatively shaped laminates, or even other forms of the floor beam 20, are formed by consolidating one or more uniform or non-uniform tacked multi-layer ply sheets 74, 76 with either one or more plies 32 of a thermoplastic composite material 30, one or more partial plies 34 of a thermoplastic material 30, or one or more uniform or non-uniform thickness tacked multi-layer tacked stacks 74, 76, and any combination thereof, in a similar method to that described herein. Further, one or more filler nuggets 26 may also be used to form additional alternative versions of the thermoplastic composite laminates 20. To accomplish any of these alternative preferred variations, modifications to the tooling within the pre-forming zone 80 is necessary so as to match the desired thickness variations for the TPC laminate 20. For example, the U-shaped tool 86 of FIG. 5 is specific for forming I-beams such as floor beam 20 of FIG. 1, an alternatively shaped tool 86 having gaps 90 is used in forming C-shaped laminates, L-shaped laminates or flat beams having a taper between respective ply layers. Similar to the U-shaped tool 86, these alternative tools include regions not contacting the stacks 74, 76 that are matched to the standardized dies 104 within the consolidating zone 102.

While the invention is ideally suited for forming thermoplastic composite laminates, by using a modified single-step consolidation zone, thermosetting laminate composites can also be formed. In this modified version of the consolidation process, the heating and pressing zones achieve a temperature above the reaction or curing temperature of the matrix resin to form a thermosetting part. Accordingly, the single pressing process achieves a part having its ultimate desired shape without subsequent pressing steps.

The invention provides an innovative method to fabricate complex thermoplastic composite laminates with tailored and varying thickness in a continuous process. This innovative process utilizes automated equipment or hand lay-up to collate parts or components into a multi-layer stack. Each stack contains all plies, including ply build-up areas, tacked in the proper location to maintain orientation and location. The consolidation structure utilizes a two-stage method for forming the composite laminates from the multi-layer stacks and contains all necessary part features to achieve this result. The tooling, such as the U-shaped tool 86 in the pre-forming zone 80 is created with an appropriate shape to create the desired thickness variations in the formed TPC laminates 20 and is further designed to mate with standardized dies with the consolidation zone 82

The composite part formed by the above method may find use in a wide variety of applications, including, for example, automotive and aerospace applications. One example of a composite part formed in accordance with the invention is ideally suited for use as structural stiffened members, including thermoplastic composite laminate floor beams 20, in a commercial aircraft.

Referring now to FIGS. 7-15, an alternate embodiment of the invention may be used to manufacture thermoplastic laminate parts that are both curved and have tailored and/or varying thickness along their length. Curved laminates can be produced in which the curvature is either constant (circular) or variable along the length of the laminate part. As in the case of the embodiment previously described, the curved thermoplastic laminate part may include tailored areas and areas of varying thickness achieved by adding partial or local plies, or areas containing pockets. "Tailored" or "tailoring" refers to the profile of the part surface, wherein the selective addition or reduction of plies in specific areas of the part can be used to achieve a desired surface profile after the plies are consolidated during the compaction process. Curved parts produced by this embodiment of the method may be used in a variety of applications such as frames, rings, formers and structural aircraft stiffened members or fuselage skins, wing skins, door panels and access panels, keel beams, floor beams, and deck beams. The curved parts can be produced with a variety of cross sections, such as those shown in FIGS. 7A-7F. A fabricated part 212 having an I-section is shown in FIG. 7A while a part 214 having a U-section is shown in FIG. 7B. An L-section part 216 shown in FIG. 7C and a T-section part is shown in FIG. 7D. A part 220 having a Z-section as shown in FIG. 7E and a part 222 having a simple rectangular section is shown in FIG. 7F. The parts shown in FIGS. 7A-7F may have either constant or variable curvature as previously mentioned, and may include areas of varying or tailored thickness at one or more points along their lengths.

Figure 8:
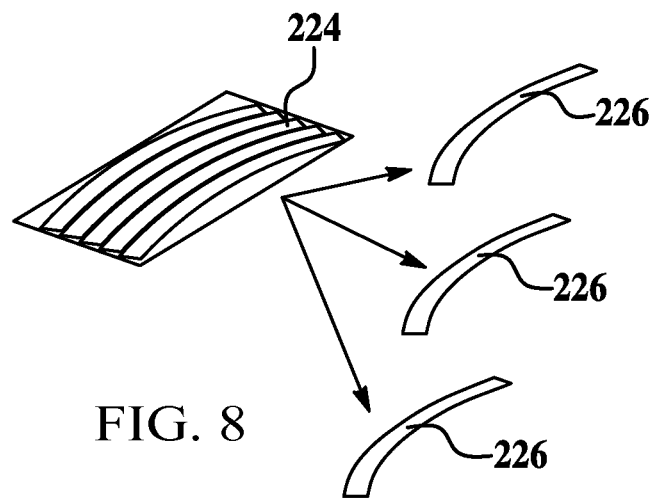
FIG. 8 is a perspective view of a tailored, multilayer stack of thermoplastic composite material, with three curved part blanks cut from the stack in accordance with an illustrative embodiment.

The preliminary steps in fabricating curved thermoplastic laminate parts in accordance with this embodiment of the method are similar to those previously described. A plurality of plies of thermoplastic material are deposited onto a conveyor table to form a collated, multi-layer non-uniform thickness or uniform thickness multi-ply stack, as previously described in connection with FIG. 2. The resulting, multi-layer stack is thus similar to the stack 58 shown in FIG. 3 which includes full and partial plies 32, 34 as well as pockets 36 created between plies 32, 34. Partial plies 62, 64 may also be included which have unidirectional fibers 38 arranged at alternating angles relative to the direction of orientation of the fibers. As previously described, the sheets in the multi-layer stack 58 are tacked together using a soldering iron or other heating device (not shown) so that the plies are held in fixed relationship to each other. A collated, tacked stack 224 produced by the method previously described is shown in FIG. 8.

The next step in the method for producing the curved composite parts comprises cutting individual part ply stacks or part blanks 226 from the collated stack 224. This cutting operation may be performed, for example, by a water jet cutter (not shown) operating under computer control which produces cut blanks 226 having an outer profile generally corresponding to the desired part curvature. As previously indicated, this curvature may be constant or may vary along the length of the part blank 226.

The part blanks 226 are fed along with a later described set of consolidation tooling 235 to a pre-forming station 275 (FIGS. 14 and 15) in a manner generally similar to that described previously with respect to producing non-curved composite parts. In the case of the present embodiment however, the consolidation tooling 235 and the blanks 226 move through a curved path as they are fed into the pre-forming station 275.

Figure 9:
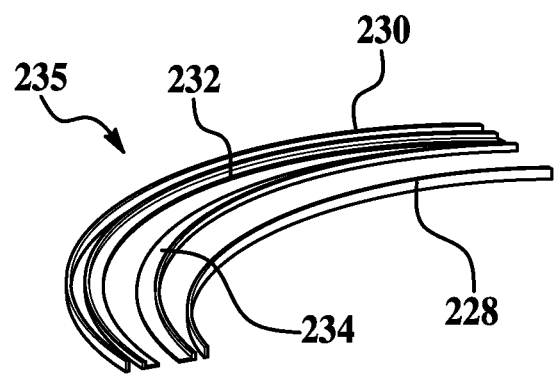
FIG. 9 is a perspective view of tooling used to form the curved thermoplastic composite parts in accordance with the method of the invention.

The consolidation tooling 235 is shown in FIG. 9 and comprises curved inner and outer tooling sleeves 228, 230 as well as upper and lower tooling sleeves 232, 234. The upper and lower tooling sleeves 232, 234 each possess a curvature corresponding to that of the blanks 226, while the inner and outer tooling sleeves 228, 230 may be either similarly curved, or flexible so as to conform to the curvature of the part blank 226 during the pre-forming process. In the example illustrated in FIGS. 9, 14 and 15, the tooling sleeves 228-234 are configured to produce the Z-section part 220 shown in FIG. 7E. Although not specifically shown in the drawings, the part-side surfaces of the tooling sleeves 228-234 contain tooling features that produce mirror image features in the part, such as varying thicknesses, varying curvature, pockets, etc.

Figure 14:
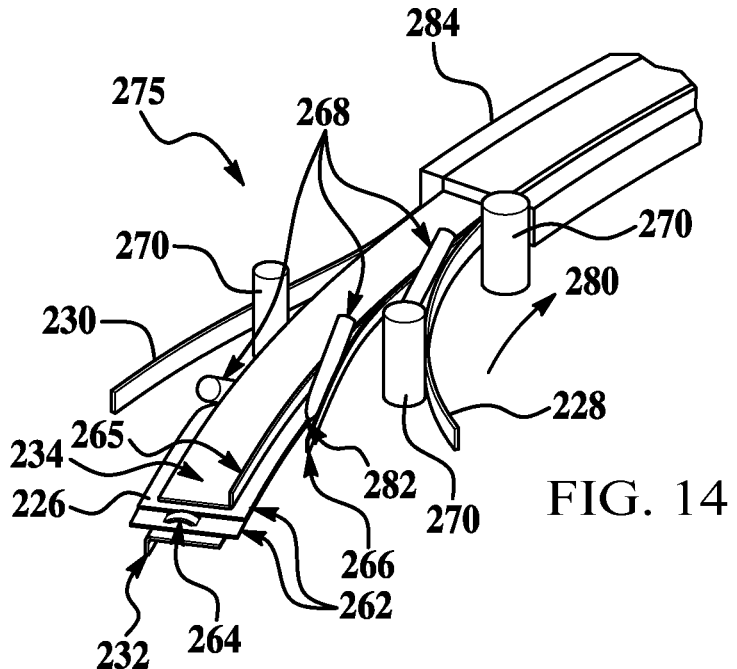
FIG. 14 is a perspective view of a pre-forming structure and a portion of a compaction press used in the method to produce curved composite parts in accordance with an illustrative embodiment.
Figure 15:
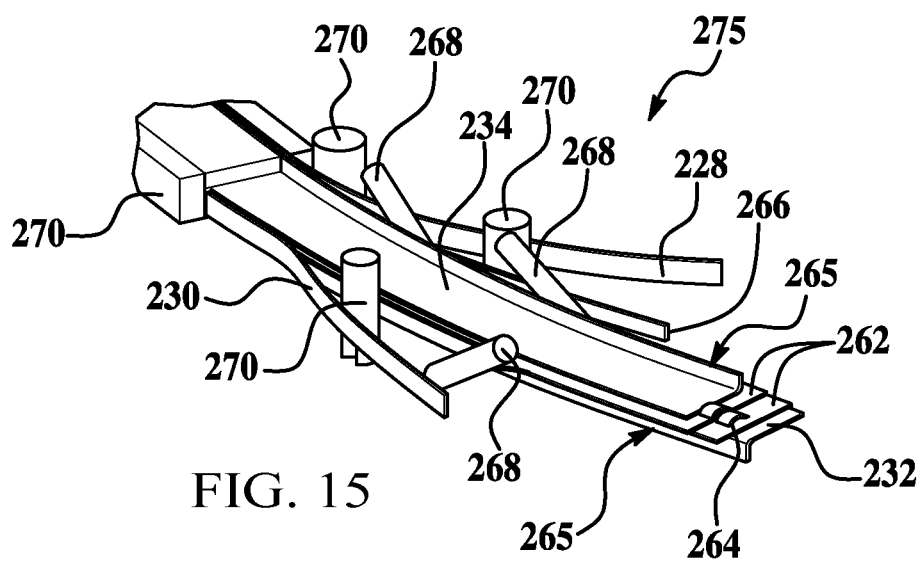
FIG. 15 is a view similar to FIG. 14 but showing the opposite side of the pre-forming structure and press in accordance with an illustrative embodiment.

Referring now particularly to FIGS. 14 and 15, the upper and lower tooling sleeves 232, 234 are assembled around the part blank 226 before the blank is fed in a curved path 280 into the pre-forming station 275 which includes a plurality of forming devices 268 and a set of guides 270. The part blank 226 can be seen to include a flat tacked stack 262 that comprises the web 220a and cap 220b (FIG. 7E) of the Z-section part 220, and a set of buildup plies 264 which form a local reinforcement of the beam web 220a.

As the sandwiched assembly comprising the part blank 226 and the tooling sleeves 232, 234 is fed into pre-forming station 275, the inner and outer tooling sleeves 228, 230 are fed into contact with the sandwiched assembly. Forming devices 268 function to deform edge portions of a blank 226 against flanges 265 on tooling sleeves 232, 234, thereby pre-forming the caps 220b of the Z-section part 220. Simultaneously, additional cap reinforcement plies 266 are fed between the forming devices 268 and the tooling flange 265. Guides 270 bring the inner and outer tooling sleeves 228, 230 into contact with the edges of the blank 226 which form the caps 220b. The preformed blank 226 along with the tooling sleeves 235 continue their movement in the curve path 280 through a curved press 284 such as a CCM machine which contains dies that impose force on the consolidation tooling 235. This force results in compaction and consolidation of the plies of the preformed part. Although not specifically shown in the drawings, heaters or ovens are provided as necessary to heat the part blank 226 to a temperature at which the polymeric component of the matrix resin in the part blank 226 has the consistency of a viscous liquid. Heating of the part blank 226 in this manner facilitates ply consolidation. In some cases, pre-heating of the part blank 226 may also be required to facilitate the pre-forming process. The need for pre-heating of the part blank 226 can depend on a number of factors, such as the number of plies, ply orientation, the type of material, the shape being preformed, etc.

Figure 17:
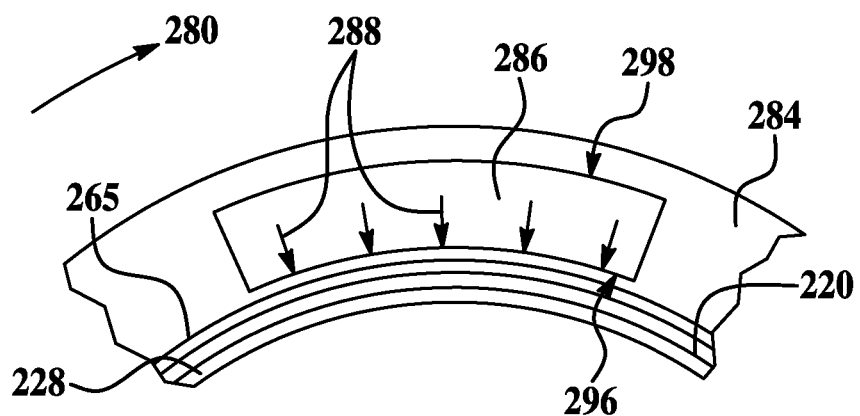
FIG. 17 is a fragmentary view of a section of the press, showing a curved die in relation to tooling sleeves for producing a part having a constant curvature in accordance with an illustrative embodiment.

The press 284 is essentially similar to that previously described in connection with FIG. 4. However unlike the press shown in FIG. 4, the dies used in press 284 will comprise some degree of curvature to accommodate the curved, preformed part 226. One such die 286 is shown in FIG. 17, where it can be seen that the inner face 296 of the die 286 has a curvature that matches the curvature of the flange 265 on the upper tooling sleeve 232. Die 286 moves inwardly in the direction of the arrows 288, into contact with the flange 265 during the compaction process, and in opposition to another curved die (not shown) which moves into contact with the inner tooling sleeve 228. The amount of curvature of the dies used in press 284 will depend, in part, on the shape of the curved part being produced and the shape of the tooling sleeves necessary for fabrication of the features in the part. The outer face 298 of the die 286 may be curved as shown in the FIG. 17, or may be flat. The preformed part is moved in the curved path 280, incrementally through the press 284. As the part movement is paused at each incremental step, the press dies impose heat and force on the tooling sleeves 235, resulting in consolidation of a section of the plies that lie beneath the dies.

Figure 18:
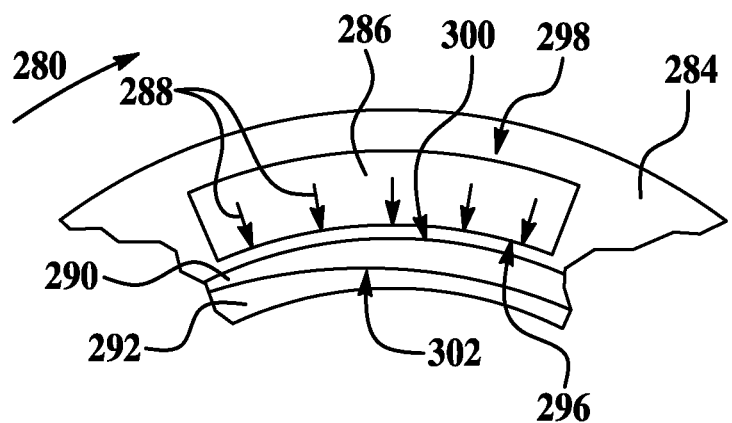
FIG. 18 is view similar to FIG. 17 but showing tooling sleeves for producing a part having a non-uniform curvature in accordance with an illustrative embodiment.

As previously indicated, the laminated part may have a varying, rather than a constant curvature, along its length, and in this connection attention is directed to FIG. 18. A die 286 used to compact a curved preformed part 292 has a constant curved inner face 296 which engages the outer face 300 of a tooling sleeve 290. The outer face 300 of tooling sleeve 290 has a constant curvature, matching the curvature of the inner face 296 of the die 286, but has an inner face 302 that is curved with a radius different than that of the outer face 300 of the tooling sleeve 290, resulting in a part 292 having a non-constant outer radius.

Figure 10:
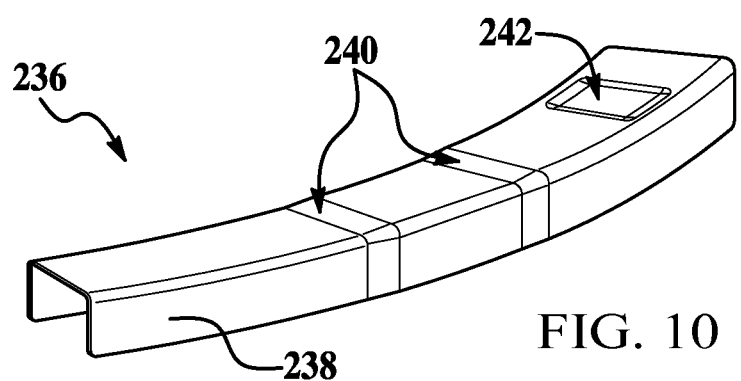
FIG. 10 is a perspective view of a curved tool used to impart features to the curved thermoplastic composite part in accordance with an illustrative embodiment.
Figure 11:
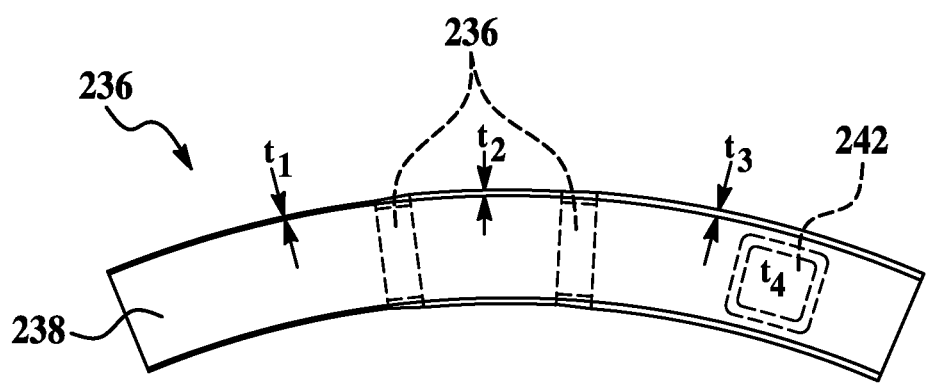
FIG. 11 is a bottom view of the tool shown in FIG. 10 in accordance with an illustrative embodiment.

Another example of a curved thermoplastic laminate part 236 is shown in FIGS. 10 and 11 wherein the part has curvature over its length and has a body 238 which is U-shaped in cross section. The body 238 has a pair of sloped ramps 240 which form transitions in the thickness of the body 238 so that the part 236 has 3 sections of different thicknesses along its length. In addition, the top side of the body 238 is provided with a pocket or depression 242 representing an area of reduced thickness in the part 236. The differing thicknesses of the body 238 are represented by $t_1$, $t_2$, $t_3$, while the thickness of the pocket 244 is represented by $t_4$. Although part 236 possesses constant inner and outer curvatures, it is to be understood that the curvature may vary along the length of the part 236.

Figure 12:
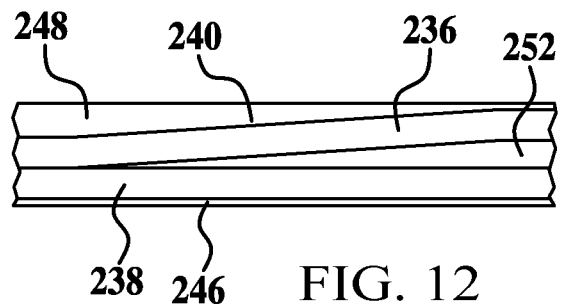
FIG. 12 is a fragmentary, cross sectional view showing a portion of a curve composite part captured between two portions of a tool in accordance with an illustrative embodiment.

FIG. 12 shows a portion of the part 236 held within tooling sleeves 246, 248 for consolidating the part plies. The part plies 236 can be seen to have a ply buildup area 252 which effectively increases the thickness of the body 238, and results in the slope 240. The tooling sleeves include a release coated metal shim 246 and an outer consolidation tool portion 248 having a ramp for forming the slope 240. As viewed in FIG. 12, the top side of the tooling sleeve 248 is flat so as to be engageable with a universal die, such as any of the dies 256 shown in FIG. 13.

Figure 13:
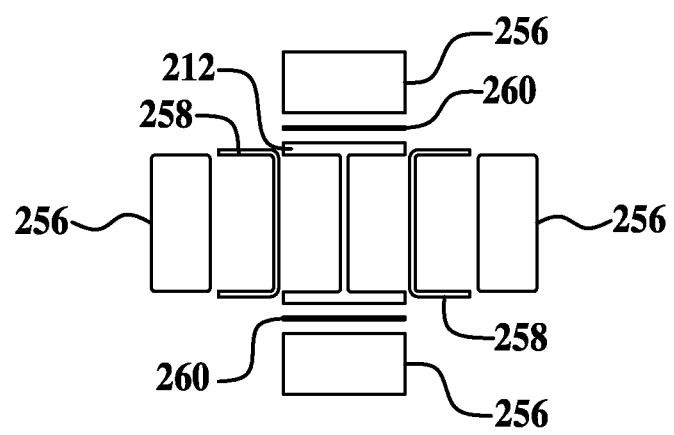
FIG. 13 is an exploded, cross sectional view of a thermoplastic composite I-section beam, shown in operative relationship to tooling and machine press dies used to compact the laminate plies in accordance with an illustrative embodiment.

FIG. 13 shows another example of a curved part 212 fabricated in accordance with the method of the invention. Part 212 comprises a curved beam having an I-shaped cross section. Conventional machine dies 256 can be used to consolidate parts that have both curvature and varying thickness along their length. In this example, the tooling sleeves comprises a pair of flat metal sheets or shims 260 and a pair of tooling sleeves 258 that are generally U-shaped in cross section. The flat sheets 260 assist in forming the caps of the part 212 while sleeves 258 function to form portions of the cap as well as the web of the part 212. The faces of the sleeves 258 that face the part 212 may have tooling features such as raised areas or ramps that impart mirror image features onto the part 212. Although not specifically shown in FIG. 13, the sheets 260 and tooling sleeves 258 may be curved along their length in order to form a part 212 that is also curved.

The invention provides an innovative method to fabricate curved thermoplastic composite laminates with tailored and varying thicknesses in a continuous process. This innovative process utilizes automated equipment or hand lay-up to collate parts or components into a multi-layer stack. Each stack contains all plies, including ply build-up areas, tacked in the proper location to maintain orientation and location. The consolidation tooling contains all necessary part features and is coordinated to the customized multiple 2 ply stacks to form a single integrated composite laminate potentially having areas of differing thicknesses from these multiple ply stacks. The composite part formed by the above method may find use in a wide variety of applications, including, for example, automotive and aerospace applications. One example of a composite part formed in accordance with the invention is ideally suited for use as structural stiffened members in a commercial aircraft.

In accordance with one aspect of the invention, a method is provided for manufacturing a curved thermoplastic laminate part having tailored and varying thickness. The method comprises the steps of: forming a multiple ply stack of thermoplastic material having non-uniform thickness; cutting a curved blank from the stack; feeding the curved blank in a curved path through a pre-forming structure to produce a preformed part; feeding the preformed part in a curved path through a press; and, pressing the preformed part to compact the plies. The plies in the stack are tacked together by local melting of the thermoplastic resin so that the plies are held in fixed relationship to each other. A plurality of part blanks may be cut from each stack of material. Each of the blanks is fed through a pre-forming structure where certain features of the part are preformed before the laminate plies are compacted. Tailored and varying thickness features of the part are formed using curved tools which are placed over the preformed part and fed along with the part into the press. Pressing the curved tool against the preformed part within the press imparts the surface features of the tool into the part as the plies are compacted.

In accordance with another aspect of the invention, a method is provided for manufacturing a curved thermoplastic laminate part having tailored and varying thickness in a continuous process. The method comprises the steps of: feeding a multi-ply thermoplastic laminate blank in a curved path through a pre-forming structure to produce a curved preformed part; feeding the curved preformed part in a curved path through a press; and, pressing the preformed part to compact the plies and impart features into the part defining the tailored and varying thickness. The method may further comprise the steps of forming a multi-ply stack of thermoplastic material having non-uniform thickness, and, cutting the curved blank from the multi-ply stack. The plies in the stack are tacked together so as to hold the plies in fixed relationship to each other as the laminate blank is fed through the pre-forming structure. The curved, preformed part is heated to the melting point of the thermoplastic resin matrix, and then moved through the press in incremental steps so that the press compacts a section of the part after each incremental step.

In accordance with still another aspect of the invention, a method is provided for manufacturing a curved thermoplastic laminate part having tailored and varying thickness features. The method comprises the steps of: forming a curved, multi-ply thermoplastic laminate blank; producing a curved preformed part by deforming portions of the blank; bringing a curved tool into contact with the curved preformed part; feeding the curved preformed part along with the curved tool in a curved path through a compaction press; and, pressing the curved tool and the curved preformed part together to compact the laminate plies and form the tailored and varying thickness. The method may further comprise the steps of forming a multi-ply stack of thermoplastic material having non-uniform thickness; and, cutting the curved blank from the stack of material. A soldering iron or the like may be used to tack the plies together so as to hold the plies in fixed relationship to each other while the blank is being deformed into a preformed part.

Figure 19:
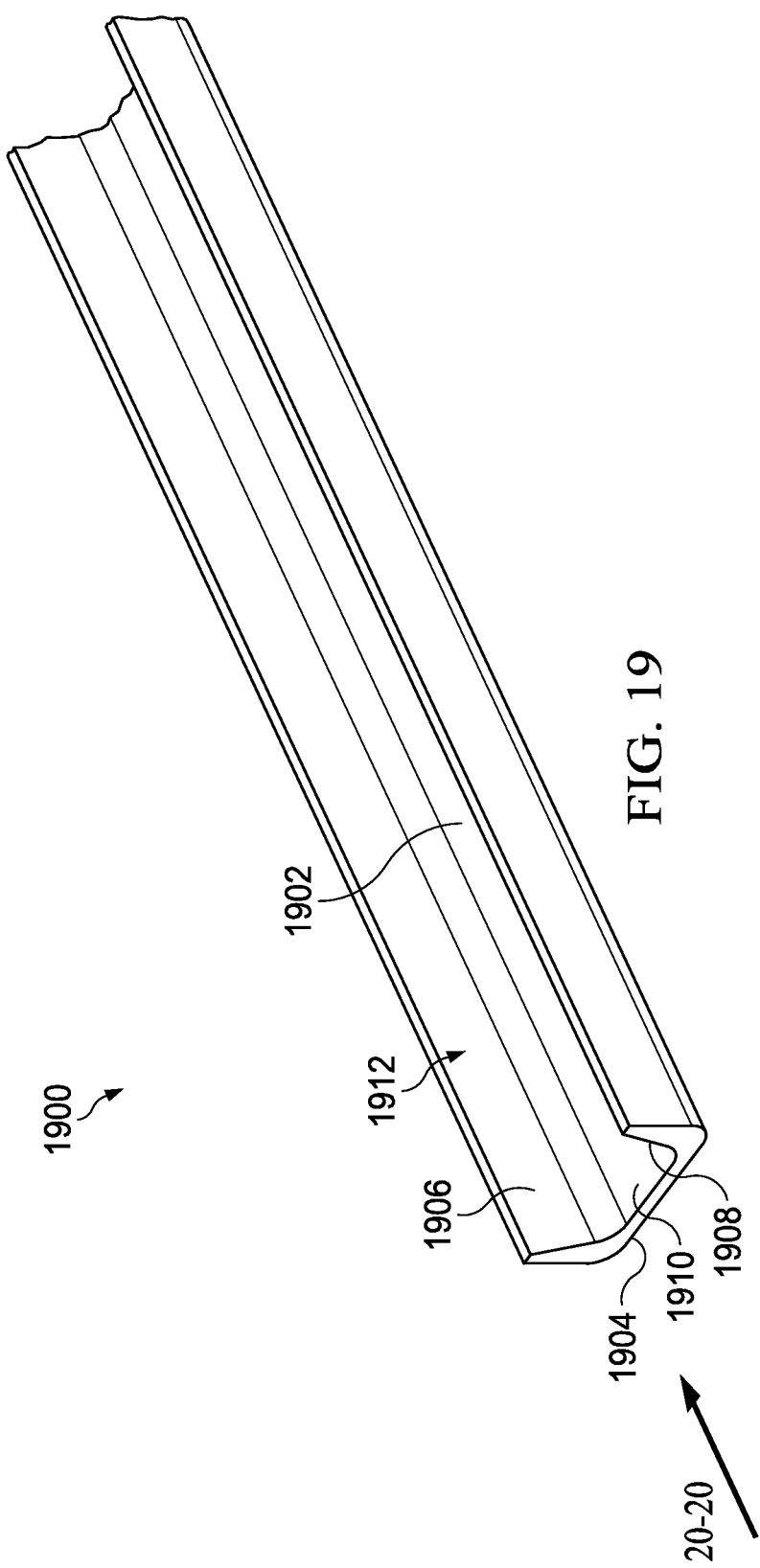
FIG. 19 is an illustration of an isometric view of an inclined sleeve in accordance with an illustrative embodiment.

Turning now to FIG. 19, an illustration of an isometric view of an inclined sleeve is depicted in accordance with an illustrative embodiment. Inclined sleeve 1900 may also be referred to as a tooling channel. Inclined sleeve 1900 may be used with associated tooling similar to U-shaped tooling channels 86 of FIG. 5.

Inclined sleeve 1900 may have first face 1902 and second face 1904. Second face 1904 may have features to mold a composite material. First face 1902 may have first inclined surface 1906, second inclined surface 1908, and substantially planar surface 1910. As depicted, substantially planar surface 1910 may be positioned between first inclined surface 1906 and second inclined surface 1908.

First face 1902 may form cavity 1912. Cavity 1912 may receive an inclined die (not depicted). The inclined die may have its own respective inclined surfaces. First inclined surface 1906 may substantially conform to a portion of the inclined die. Second inclined surface 1908 may substantially conform to a second portion of the inclined die.

To form a composite material, inclined sleeve 1900 may be positioned between the inclined die and the composite material. In these illustrative examples, first face 1902 may engage the inclined die while second face 1904 may contact the composite material.

Figure 20:
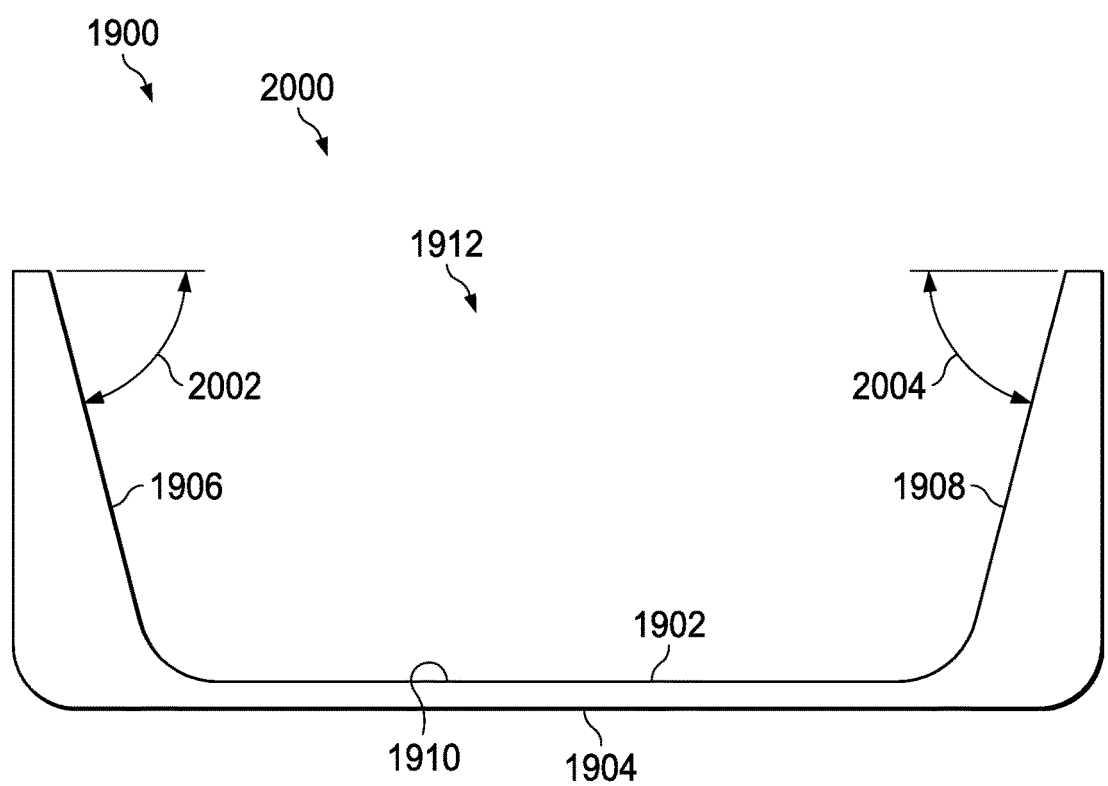
FIG. 20 is an illustration of a front view of an inclined sleeve in accordance with an illustrative embodiment.

Turning now to FIG. 20, an illustration of a front view of an inclined sleeve is depicted in accordance with an illustrative embodiment. View 2000 may be a view of inclined sleeve 1900 from direction 20-20 of FIG. 19. First inclined surface 1906 may be positioned at angle 2002 relative to substantially planar surface 1910. Second incline surface 1908 may be positioned at angle 2004 relative to substantially planar surface 1910. As depicted, angle 2002 and angle 2004 are about the same. However, in some illustrative examples, angle 2002 and angle 2004 may be different from each other.

As depicted, angle 2002 and angle 2004 may be about 75 degrees. However, angle 2002 and angle 2004 may be any desirable angle within greater than about 0 degrees and less than about 90 degrees. Angle 2002 may be selected based on at least one of an angle of an inclined surface of an inclined die, manufacturing tolerances, material properties of the material of inclined sleeve 1900, or other desirable information. For example, angle 2002 may be selected such that undesirable heat transfer properties due to the thickness of material of inclined sleeve 1900 are reduced. For example, reducing angle 2002 may increase the thickness of material of inclined sleeve 1900. As used herein, reducing angle 2002 may cause angle 2002 to approach 0 degrees. With increased thickness of inclined sleeve 1900, inclined sleeve 1900 may take longer to heat and cool. As a result, heat transfer properties may become more undesirable as angle 2002 decreases.

As another example, angle 2002 may be selected such that the weight of inclined sleeve 1900 is not undesirably high. For example, reducing angle 2002 may increase the thickness of material of inclined sleeve 1900. Increasing the thickness of the material of inclined sleeve 1900 may also increase the weight of inclined sleeve 1900.

Angle 2004 may be selected based on at least one of an angle of an inclined surface of an inclined die, manufacturing tolerances, material properties of the material of inclined sleeve 1900, or other desirable information. For example, angle 2004 may be selected such that undesirable heat transfer properties due to the thickness of material of inclined sleeve 1900 are reduced. For example, reducing angle 2004 may increase the thickness of material of inclined sleeve 1900. As used herein, reducing angle 2004 may cause angle 2004 to approach 0 degrees. With increased thickness of inclined sleeve 1900, inclined sleeve 1900 may take longer to heat and cool. As a result, heat transfer properties may become more undesirable as angle 2004 decreases. As another example, angle 2004 may be selected such that the weight of inclined sleeve 1900 is not undesirably high. For example, reducing angle 2004 may increase the thickness of material of inclined sleeve 1900. Increasing the thickness of the material of inclined sleeve 1900 may also increase the weight of inclined sleeve 1900.

Figure 21:
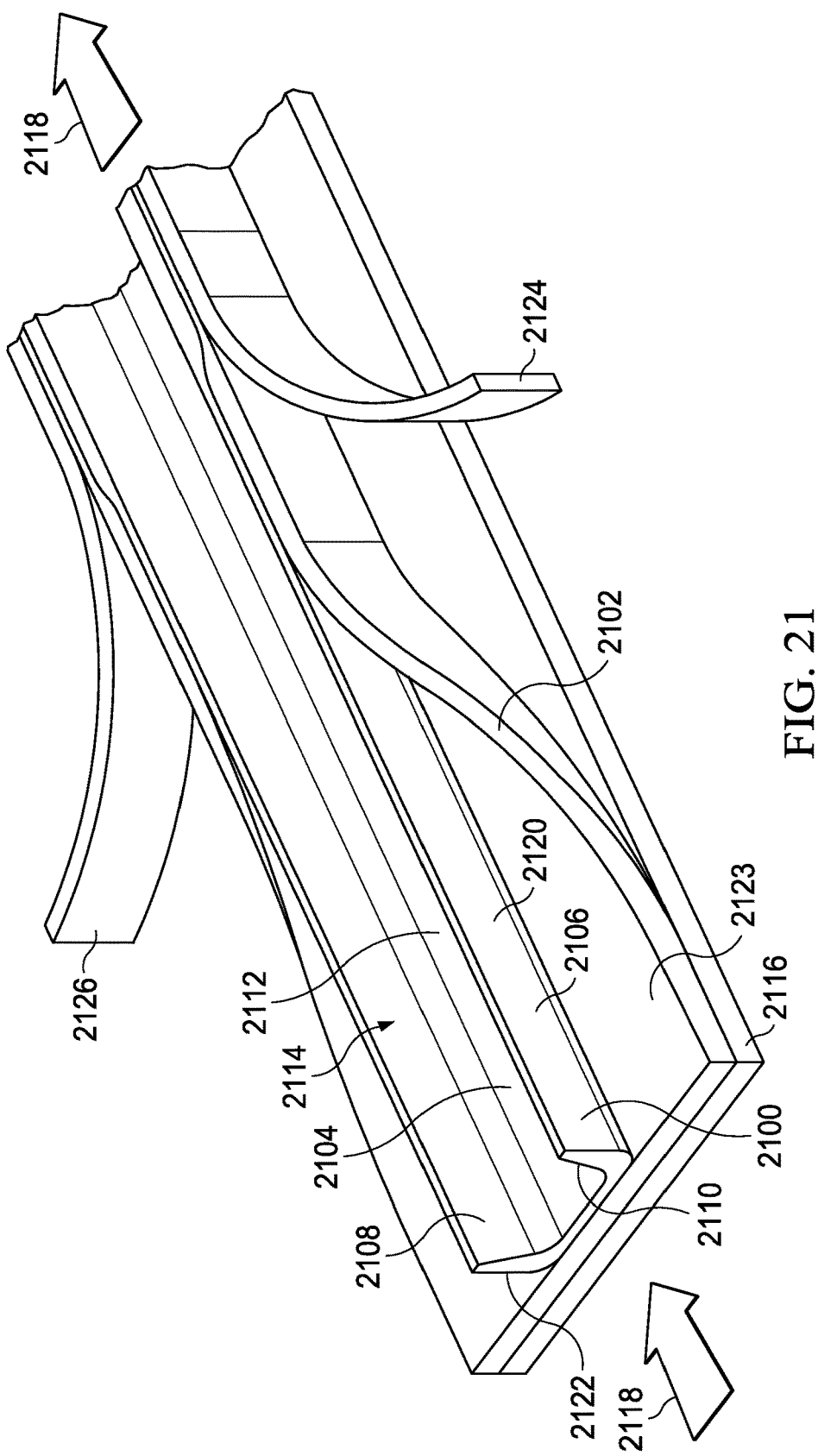
FIG. 21 is an illustration of one example of an isometric view of an inclined sleeve, tooling, and composite material in accordance with an illustrative embodiment.

Turning now to FIG. 21, an illustration of one example of an isometric view of an inclined sleeve, tooling, and composite material is depicted in accordance with an illustrative embodiment. As depicted, inclined sleeve 2100 may be used as a U-shaped tooling channel 86 of FIG. 5. Inclined sleeve 2100 may be used in a continuous compression molding machine to shape composite material 2102.

Inclined sleeve 2100 may have first face 2104 and second face 2106. Second face 2106 may have features to mold composite material 2102. First face 2104 may have first inclined surface 2108, second inclined surface 2110, and substantially planar surface 2112. As depicted, substantially planar surface 2112 may be positioned between first inclined surface 2108 and second inclined surface 2110.

First face 2104 may form cavity 2114. Cavity 2114 may receive an inclined die (not depicted). As depicted, composite material 2102 may be positioned between inclined sleeve 2100 and base 2116. Inclined sleeve 2100, composite material 2102, and base 2116 may all move in direction 2118 towards a continuous compression molding machine (not depicted). As inclined sleeve 2100, composite material 2102, and base 2116 may all move in direction 2118, composite material 2102 may be formed to contact side 2120 and side 2122 of second face 2106. Specifically, surface 2123 may be formed to second face 2106. Side tooling member 2124 and side tooling member 2126 may be positioned relative to composite material 2102 and inclined sleeve 2100. Each of inclined sleeve 2100, composite material 2102, base 2116, side tooling member 2124, and side tooling member 2126 may move in direction 2118 towards an inclined die of the continuous compression molding machine.

As depicted, inclined sleeve 2100 and a continuous compression molding machine may form composite material 2102 into U-shaped cross-sectional-shape 2128. U-shaped cross-sectional shape 2128 may also be referred to as a C-shaped cross-sectional shape or C channel. However, in other illustrative examples, inclined sleeve 2100 may be used alone or in conjunction with other tools or sleeves to form composite material 2102 in a different cross-sectional shape than U-shaped cross-sectional shape. For example, inclined sleeve 2100 may be used alone or in conjunction with other tools or sleeves to form composite material 2102 in a cross-sectional shape selected from a trapezoidal shape, a triangular shape, a J shape, an I shape, a Z shape or any other desirable cross-sectional shape.

As inclined sleeve 2100 is moved in direction 2118, a shim (not depicted) may be placed within cavity 2114. A shim may be a piece of material placed within cavity 2114 such that any inconsistencies in first inclined surface 2108, second inclined surface 2110, or substantially planar surface 2112 may not affect application of pressure to composite material 2102. In some illustrative examples, inconsistencies in any of first inclined surface 2108, second inclined surface 2110, or inclined surfaces of an inclined die may cause the inclined sleeve to engage inclined sleeve 2100 in an undesirable manner. Specifically, inconsistencies in any of first inclined surface 2108, second inclined surface 2110, or inclined surfaces of an inclined die may cause the inclined die to not fully move downward into inclined sleeve 2100. Inconsistencies may include bumps, dips, differing inclines, or other types of surface inconsistencies. When the inclined die does not move completely downward into inclined sleeve 2100, the inclined die may not contact substantially planar surface 2112 or may only partially contact substantially planar surface 2112. When the inclined die does not move completely downward into inclined sleeve 2100, application of pressure to composite material 2102 may be affected. For example, application of pressure to composite material 2102 may not be uniform. As a result, a shim may be positioned such that an inclined die may contact the shim and inclined sleeve 2100 to impart a substantially uniform pressure to composite material 2102. Further, a shim may be positioned such that inconsistencies in either substantially planar surface 2112 or a substantially planar surface of an inclined die may not affect application of pressure to composite material 2102.

The shim may be positioned between the first face of an inclined die and first face 2104 of inclined sleeve 2100. The shim may be in contact with at least a portion of substantially planar surface 2112. The shim may be positioned between a second substantially planar surface of an inclined die and substantially planar surface 2112 of inclined sleeve 2100. The shim may contact at least a portion of a second substantially planar surface of an inclined die and at least a portion of substantially planar surface 2112 of inclined sleeve 2100.

A shim may be formed from a rigid material. A rigid material may be machined or otherwise formed to a desirable shape for the shim. A shim may be formed from a malleable material. When a shim is formed of a malleable material, the shim may "self-form" to a desirable shape between an inclined die and inclined sleeve 1900. The shim could have a constant thickness or a varying thickness as desirable.

Figure 22:
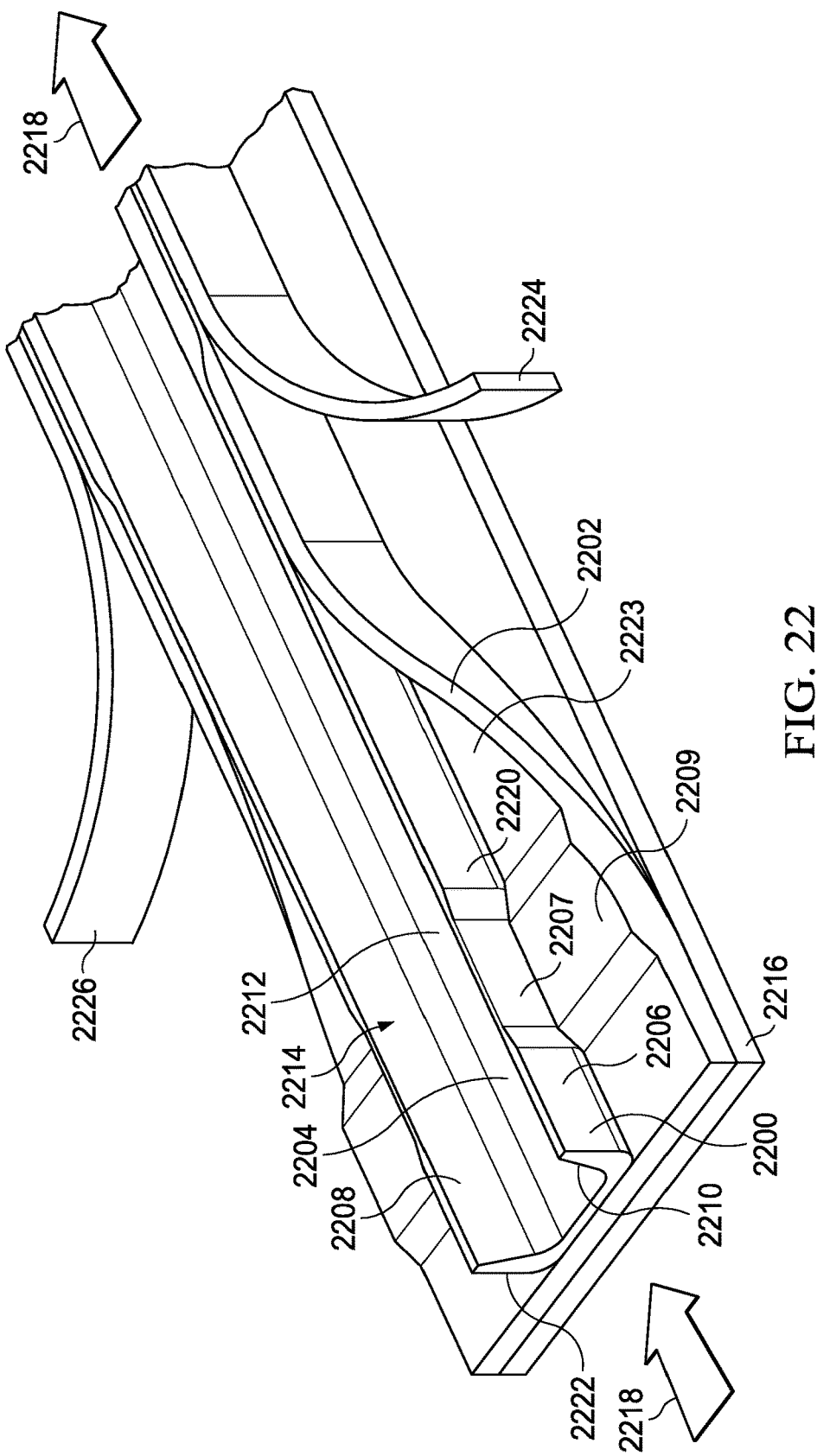
FIG. 22 is an illustration of another example of an isometric view of an inclined sleeve, tooling, and composite material in accordance with an illustrative embodiment.

Turning now to FIG. 22, an illustration of another example of an isometric view of an inclined sleeve, tooling, and composite material is depicted in accordance with an illustrative embodiment. As depicted, inclined sleeve 2200 may be used as a U-shaped tooling channel 86 of FIG. 5. Inclined sleeve 2200 may be used in a continuous compression molding machine to shape composite material 2202. Composite material 2202 may be formed into a U-shaped cross-sectional shape using inclined sleeve 2200.

A U-shaped cross-sectional shape may also be referred to as a C-shaped cross-sectional shape or C channel. However, in other illustrative examples, inclined sleeve 2200 may be used alone or in conjunction with other tools or sleeves to form composite material 2102 in a different cross-sectional shape than U-shaped cross-sectional shape. For example, inclined sleeve 2200 may be used alone or in conjunction with other tools or sleeves to form composite material 2202 in a cross-sectional shape selected from a trapezoidal shape, a triangular shape, a J shape, an I shape, a Z shape or any other desirable cross-sectional shape.

Inclined sleeve 2200 may have first face 2204 and second face 2206. Second face 2206 may have features to mold composite material 2202. As depicted, second face 2206 has feature 2207 to mold composite material 2202. As can be seen from FIG. 22, feature 2207 may contact ply addition 2209 of composite material 2202. Feature 2207 may allow for about equal pressure to be exerted on all of composite material 2202, including ply addition 2209, by a continuous compression molding machine. As depicted, feature 2207 may substantially mirror ply addition 2209. In other words, feature 2207 may be substantially the inverse of ply addition 2209. In some illustrative examples, feature 2207 may not substantially mirror ply addition 2209. In some illustrative examples, feature 2207 may be different than the shape of composite material 2202. By feature 2207 being different than the shape of composite material 2202, inclined sleeve 2200 may mold composite material 2202.

First face 2204 may have first inclined surface 2208, second inclined surface 2210, and substantially planar surface 2212. As depicted, substantially planar surface 2212 may be positioned between first inclined surface 2208 and second inclined surface 2210.

First face 2204 may form cavity 2214. Cavity 2214 may receive an inclined die (not depicted). As depicted, composite material 2202 may be positioned between inclined sleeve 2200 and base 2216. Inclined sleeve 2200, composite material 2202, and base 2216 may all move in direction 2218 towards a continuous compression molding machine (not depicted). As inclined sleeve 2200, composite material 2202, and base 2216 may all move in direction 2218, composite material 2202 may be formed to contact side 2220 and side 2222 of second face 2206. Specifically, surface 2223 may be formed to second face 2206. Side tooling member 2224 and side tooling member 2226 may be positioned relative to composite material 2202 and inclined sleeve 2200. Each of inclined sleeve 2200, composite material 2202, base 2216, side tooling member 2224, and side tooling member 2226 may move in direction 2218 towards an inclined die of the continuous compression molding machine.

As inclined sleeve 2200 is moved in direction 2218, a shim may be placed within cavity 2214. A shim may be a piece of material placed within cavity 2214 such that any inconsistencies in substantially planar surface 2212 may not affect application of pressure to composite material 2202.

A shim may be formed from a rigid material. A rigid material may be machined or otherwise formed to a desirable shape for the shim. A shim may be formed from a malleable material. When a shim is formed of a malleable material, the shim may "self-form" to a desirable shape between an inclined die and inclined sleeve 2200. The shim could have a constant thickness or a varying thickness as desirable.

Although composite material 2202 is depicted as substantially covering second face 2206, in some examples, composite material 2202 may not substantially cover second face 2206. For example, composite material 2202 may not contact side 2220. In some illustrative examples, composite material 2202 may not contact either side 2220 or side 2222. In these illustrative examples, composite material 2202 may only be positioned between inclined sleeve 2200 and base 2216.

Figure 23:
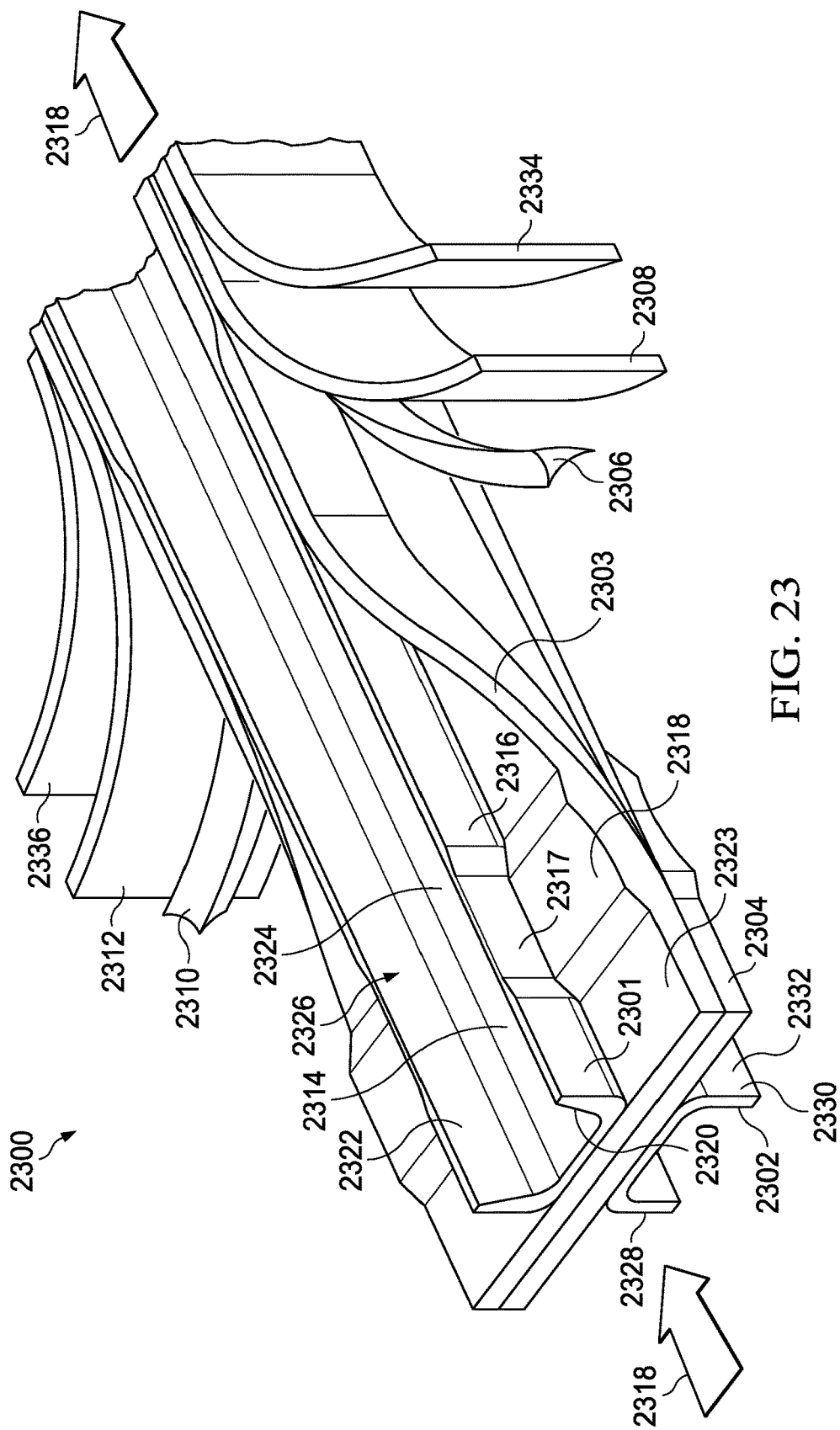
FIG. 23 is an illustration of a further example of an isometric view of an inclined sleeve, tooling, and composite material in accordance with an illustrative embodiment.

Turning now to FIG. 23, an illustration of a further example of an isometric view of an inclined sleeve, tooling, and composite material is depicted in accordance with an illustrative embodiment. Assembly 2300 includes inclined sleeve 2301. As depicted, inclined sleeve 2301 may be used as a U-shaped tooling channel 86 of FIG. 5. In this illustrative example, inclined sleeve 2301 is used along with a bottom U-shaped tooling channel 2302. U-shaped tooling channel 2302 does not have inclined surfaces. Inclined sleeve 2301 and U-shaped tooling channel 2302 may be used to form an I-shaped composite part.

Inclined sleeve 2301 may be used in a continuous compression molding machine to shape composite material 2303. Composite material 2303 may be formed into a U-shape using inclined sleeve 2301. Composite material 2304 may be formed into a U-shape using U-shaped tooling channel 2302. Composite filler 2306, composite ply 2308, composite filler 2310, and composite ply 2312 may be positioned relative to composite material 2303 and composite material 2304 to form an I-shaped composite part.

Inclined sleeve 2301 may have first face 2314 and second face 2316. Second face 2316 may have features to mold composite material 2303. As depicted, second face 2316 has feature 2317 to mold composite material 2303. As can be seen from FIG. 23, feature 2317 may contact ply addition 2318 of composite material 2303. Feature 2317 may allow for ply drop-offs or ramp-ups. Feature 2317 may allow for about equal pressure to be exerted on all of composite material 2303, including ply addition 2318, by a continuous compression molding machine.

As depicted, feature 2317 may substantially mirror ply addition 2318. In other words, feature 2317 may be substantially the inverse of ply addition 2318. In some illustrative examples, feature 2317 may not substantially mirror ply addition 2318. In some illustrative examples, feature 2317 may be different than the shape of composite material 2303. By feature 2317 being different than the shape of composite material 2303, inclined sleeve 2301 may mold composite material 2303.

First face 2314 may have first inclined surface 2320, second inclined surface 2322, and substantially planar surface 2324. As depicted, substantially planar surface 2324 may be positioned between first inclined surface 2320 and second inclined surface 2322.

First face 2314 may form cavity 2326. Cavity 2326 may receive an inclined die (not depicted). As depicted, composite material 2303 may be positioned between inclined sleeve 2301 and composite material 2304.

As inclined sleeve 2301 and composite material 2303 move in direction 2318, composite material 2303 may be formed to contact side 2328 and side 2330 of second face 2316. Specifically, surface 2323 may be formed to second face 2316. As U-shaped tooling channel 2302 and composite material 2304 move in direction 2318, composite material 2304 may be formed to contact side 2328 and side 2330 of face 2332 of U-shaped tooling channel 2302.

As inclined sleeve 2301, U-shaped tooling channel 2302, composite material 2303 and composite material 2304 are moved in direction 2318, composite filler 2306 and composite filler 2310 may be positioned relative to composite material 2303 and composite material 2304. Specifically, composite filler 2306 and composite filler 2310 may be positioned within gaps at the interface of composite material 2303 and composite material 2304. Composite filler 2306 and composite filler 2310 may each also be referred to as a composite noodle or simply a noodle.

Further, as inclined sleeve 2301, U-shaped tooling channel 2302, composite material 2303, composite material 2304, composite filler 2306, and composite filler 2310 are moved in direction 2318, composite ply 2308 and composite ply 2312 may be positioned relative to composite material 2303 and composite material 2304. Specifically, composite ply 2308 may be positioned over portions of composite material 2303, portions of composite material 2304, and composite filler 2306. Composite ply 2312 may be positioned over portions of composite material 2303, portions of composite material 2304, and composite filler 2306.

Inclined sleeve 2301, U-shaped tooling channel 2302, composite material 2303, composite material 2304, composite filler 2306, composite ply 2308, composite filler 2310, and composite ply 2312 may all move in direction 2318 towards a continuous compression molding machine (not depicted). As inclined sleeve 2301, U-shaped tooling channel 2302, composite material 2303, composite material 2304, composite filler 2306, composite ply 2308, composite filler 2310, and composite ply 2312 move in direction 2318 towards a continuous compression molding machine, side tooling member 2334 and side tooling member 2336 may be positioned relative to composite ply 2308 and composite ply 2312, respectively. In a continuous compression molding machine, an inclined die may impact inclined sleeve 2301. In a continuous compression molding machine, a respective die may impact each of U-shaped tooling channel 2302, side tooling member 2334, and side tooling member 2336.

Figure 24:
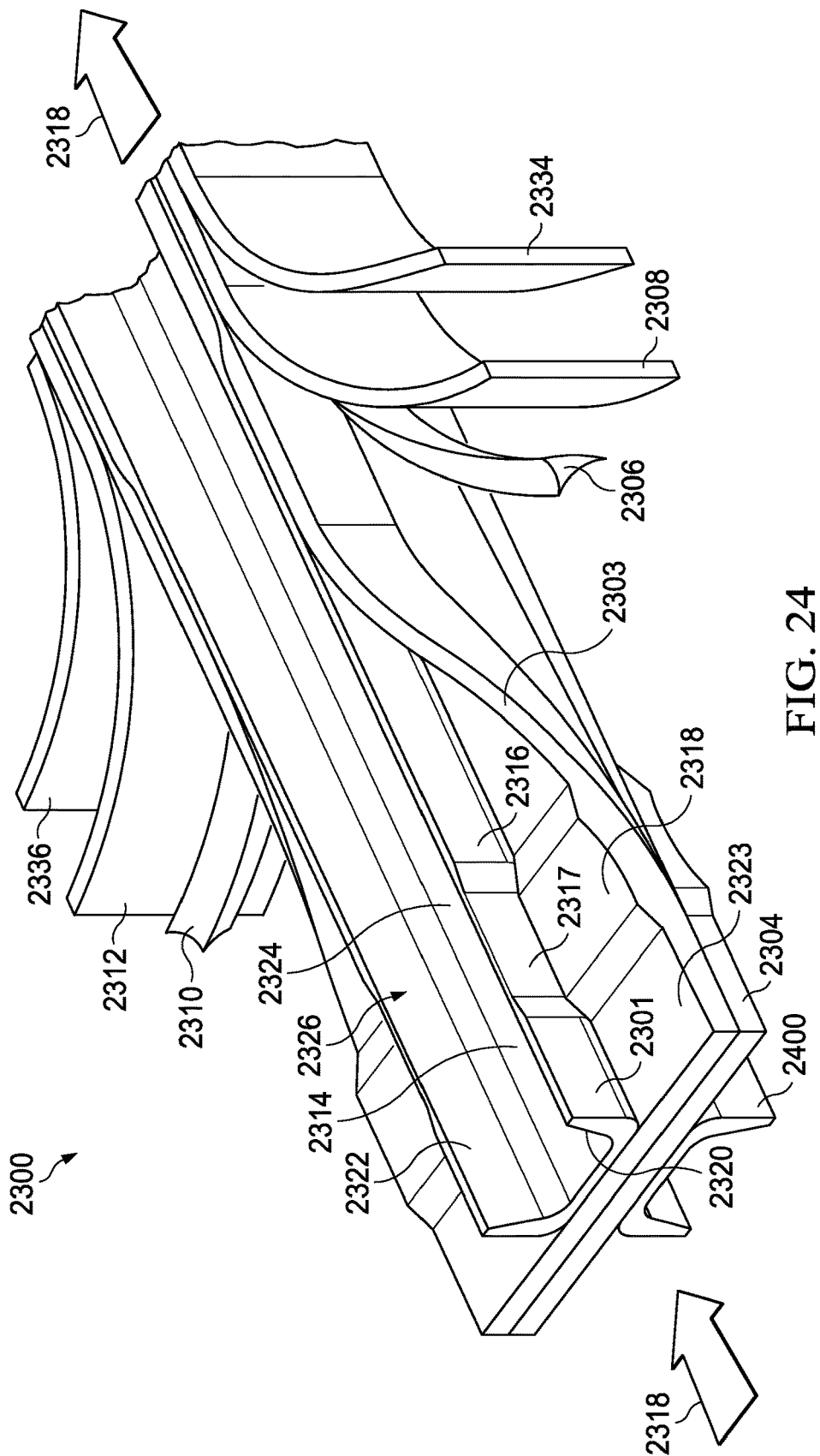
FIG. 24 is an illustration of another example of an isometric view of an inclined sleeve, tooling, and composite material in accordance with an illustrative embodiment.

Turning now to FIG. 24, an illustration of another example of an isometric view of an inclined sleeve, tooling, and composite material is depicted in accordance with an illustrative embodiment. FIG. 24 is a view of assembly 2300 with inclined sleeve 2400 replacing U-shaped tooling channel 2302. In this illustrative example, a second inclined die may impact inclined sleeve 2400 in a continuous compression molding machine.

Figure 25:
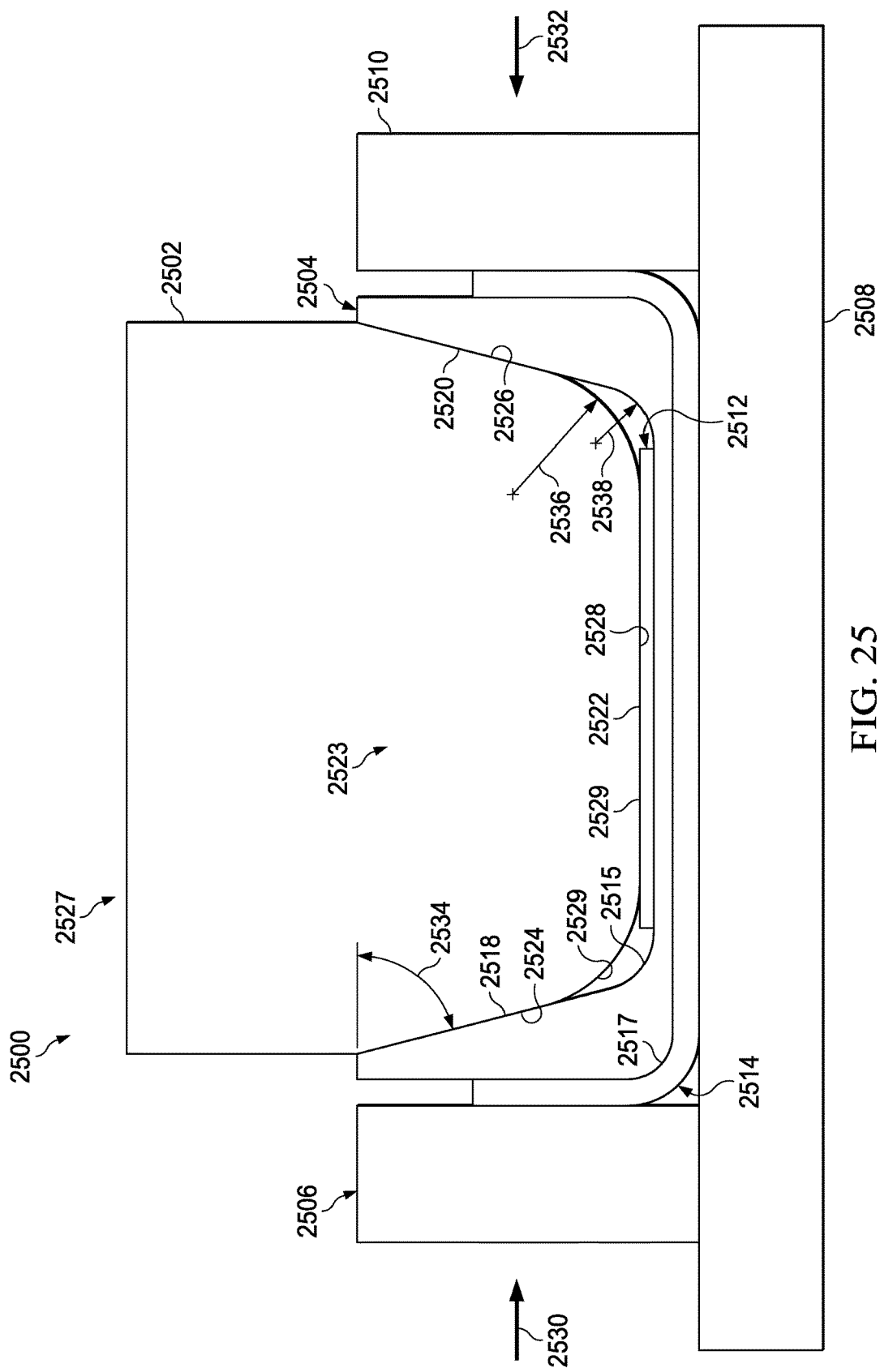
FIG. 25 is an illustration of a cross-sectional view of an inclined sleeve in a continuous compression molding machine in accordance with an illustrative embodiment.

Turning now to FIG. 25, an illustration of a cross-sectional view of an inclined sleeve in a continuous compression molding machine is depicted in accordance with an illustrative embodiment. Continuous compression molding environment 2500 may be a simplified view within a continuous compression molding machine. View 2501 may be of an inclined sleeve within a continuous compression molding machine, such as inclined sleeve 2100 of FIG. 21 in cross-section 25-25 from direction 2130. Continuous compression molding environment 2500 includes inclined die 2502, inclined sleeve 2504, side tooling member 2506, base 2508, side tooling member 2510, shim 2512, and composite material 2514. Composite material 2514 may take the form of a multiple ply stack. A multiple ply stack may have a number of ply orientations. As used herein, a number of items means one or more items. For example, a multiple ply stack may have one or more ply orientations.

As depicted, inclined die 2502 may engage inclined sleeve 2504. Inclined die 2502 may also be referred to as a continuous compression molding die. Inclined sleeve 2504 may have first face 2515 and second face 2517. Second face 2517 may have features to mold composite material 2514. First face 2515 may have first inclined surface 2518, second inclined surface 2520, and substantially planar surface 2522.

Substantially planar surface 2522 may be positioned between first inclined surface 2518 and second inclined surface 2520. First inclined surface 2518 may substantially conform to a portion of inclined die 2502. Second inclined surface 2520 may substantially conform to a second portion of inclined die 2502. First face 2515 forms cavity 2523 that may receive inclined die 2502.

Inclined die 2502 may have third inclined surface 2524, fourth inclined surface 2526, and substantially planar surface 2528. Third inclined surface 2524, fourth inclined surface 2526, and substantially planar surface 2528 may form face 2529. Third inclined surface 2524 may engage first inclined surface 2518. Fourth inclined surface 2526 may engage second inclined surface 2520. In some illustrative examples, inconsistencies which are out of tolerance in any of first inclined surface 2518, second inclined surface 2520, third inclined surface 2524, or fourth inclined surface 2526 may cause inclined die 2502 to engage inclined sleeve 2504 in an undesirable manner. Inconsistencies which are out of tolerance may include bumps, dips, differing inclines, or other types of surface inconsistencies. Specifically, inconsistencies in any of first inclined surface 2518, second inclined surface 2520, third inclined surface 2524, or fourth inclined surface 2526 may cause inclined die 2502 to not fully move downward into inclined sleeve 2504. When inclined die 2502 does not move completely downward into inclined sleeve 2504, inclined die 2502 may not contact substantially planar surface 2522 or may only partially contact substantially planar surface 2522. When inclined die 2502 does not move completely downward into inclined sleeve 2504, application of pressure to composite material 2102 may be affected. For example, application of pressure to composite material 2514 may not be uniform. Because inconsistencies in any of first inclined surface 2518, second inclined surface 2520, third inclined surface 2524, or fourth inclined surface 2526 may cause inclined die 2502 to not contact substantially planar surface 2522 or only partially contact substantially planar surface 2522, it may be said that first inclined surface 2518, second inclined surface 2520, third inclined surface 2524, or fourth inclined surface 2526 may concentrate inconsistencies between substantially planar surface 2522 and substantially planar surface 2528. In other words, by third inclined surface 2524 engaging first inclined surface 2518 and fourth inclined surface 2526 engaging second inclined surface 2520, inconsistencies may be concentrated between substantially planar surface 2522 and substantially planar surface 2528.

By concentrating inconsistencies between substantially planar surface 2522 and substantially planar surface 2528, shim 2512, a single shim, may be used to compensate for inconsistencies in any of the surfaces. In other words, shim 2512 may compensate for inconsistencies in any of first inclined surface 2518, second inclined surface 2520, third inclined surface 2524, fourth inclined surface 2526, substantially planar surface 2522, or substantially planar surface 2528. As a result, shim 2512 may be positioned such that inclined die 2502 may contact shim 2512 and inclined sleeve 2504 to impart a substantially uniform pressure to composite material 2514. Further, shim 2512 may be positioned such that inconsistencies in either substantially planar surface 2112 or substantially planar surface 2528 may not affect application of pressure to composite material 2514.

Shim 2512 may be used to provide substantially even pressure to composite material 2514. Shim 2512 may be a piece of material placed within cavity 2523 such that inconsistencies which are out of tolerance may not affect application of pressure to composite material 2514. Shim 2512 may be positioned between inclined sleeve 2504 and inclined die 2502. Shim 2512 may be positioned between first face 2529 of an inclined die 2502 and first face 2515 of inclined sleeve 2504.

Shim 2512 may be in contact with at least a portion of substantially planar surface 2522. Shim 2512 may be positioned between second substantially planar surface 2528 of inclined die 2502 and substantially planar surface 2522 of inclined sleeve 2504. Shim 2512 may contact at least a portion of second substantially planar surface 2528 of inclined die 2502 and at least a portion of substantially planar surface 2522 of inclined sleeve 2504.

Shim 2512 may be formed from a rigid material. A rigid material may be machined or otherwise formed to a desirable shape for shim 2512. Shim 2512 may be formed from a malleable material. When shim 2512 is formed of a malleable material, shim 2512 may "self-form" to a desirable shape between inclined die 2502 and inclined sleeve 2504. Shim 2512 could have a constant thickness or a varying thickness as desirable.

Further, shape of inclined die 2502 may be self-locating. Specifically, third inclined surface 2524 and fourth inclined surface 2526 may allow inclined die 2502 to be self-locating. When inclined die 2502 is self-locating, third inclined surface 2524 and fourth inclined surface 2526 may allow inclined die 2502 to reach desired position 2527. Specifically, when inclined die 2502 is self-locating, when inclined die 2502 is moved towards inclined sleeve 2504, third inclined surface 2524 and fourth inclined surface 2526 may guide inclined die 2502 to move until inclined die 2502 is in desired position 2527.

As depicted, inclined sleeve 2504 may move into the page through continuous compression molding environment 2500. In these illustrative examples, inclined sleeve 2504 may stay in substantially the same location relative to composite material 2514 during forming of composite material 2514. In other words, both inclined sleeve 2504 and composite material 2514 may move into the page incrementally during forming of composite material 2514.

During forming of composite material 2514, side tooling member 2506 may contact composite material 2514. Further, during forming of composite material 2514, side tooling member 2510 may contact composite material 2514. In some illustrative examples, side tooling member 2506 and side tooling member 2510 may remain in contact with composite material 2514 as composite material 2514 moves through the continuous compression molding machine. In these illustrative examples, side tooling member 2506 and side tooling member 2510 may be impacted by a respective die of continuous compression molding machine.

In some illustrative examples, side tooling member 2506 may move in direction 2530 to contact composite material 2514 each time pressure is applied to composite material 2514 as composite material 2514 moves into the page through the continuous compression molding machine. In other words, side tooling member 2506 may move in direction 2530 to contact composite material 2514 and then be retracted in direction 2532 to form each increment of composite material 2514 in continuous compression molding machine.

Side tooling member 2510 may move in direction 2532 to contact composite material 2514 each time pressure is applied to composite material 2514 as composite material 2514 moves into the page through the continuous compression molding machine. In other words, side tooling member 2510 may move in direction 2532 to contact composite material 2514 and then be retracted in direction 2530 to form each increment of composite material 2514 in continuous compression molding machine.

Third inclined surface 2524 and first inclined surface 2518 each have angle 2534. Angle 2534 may be selected based on at least one of manufacturing tolerances, material properties of the material of inclined sleeve 2504, or other desirable information. For example, angle 2534 may be selected such that undesirable heat transfer properties due to the thickness of material of inclined sleeve 2504 are reduced. For example, reducing angle 2534 may increase the thickness of material of inclined sleeve 2504. As used herein, reducing angle 2534 may cause angle 2534 to approach 0 degrees. With increased thickness of inclined sleeve 2504, inclined sleeve 2504 may take longer to heat and cool. As a result, heat transfer properties may become more undesirable as angle 2534 decreases. As another example, angle 2534 may be selected such that the weight of inclined sleeve 2504 is not undesirably high. For example, reducing angle 2534 may increase the thickness of material of inclined sleeve 2504. Increasing the thickness of the material of inclined sleeve 2504 may also increase the weight of inclined sleeve 2504.

First face 2529 of inclined die 2502 may have radius 2536. First face 2515 of inclined sleeve 2504 may have radius 2538. As depicted, radius 2536 may be larger than radius 2538. When radius 2536 is larger than radius 2538, inclined die 2502 may not be connected to inclined sleeve 2504 without a number of connectors. In other words, the shape of inclined die 2502 may not cause a binding condition with inclined sleeve 2504 when radius 2536 is larger than radius 2538.

Continuous compression molding environment 2500 may be a simplified view within a continuous compression molding machine. Continuous compression molding environment 2500 is simplified for description of inclined sleeve 2504. A continuous compression molding machine may include other components not shown within FIG. 25.

Figure 26:
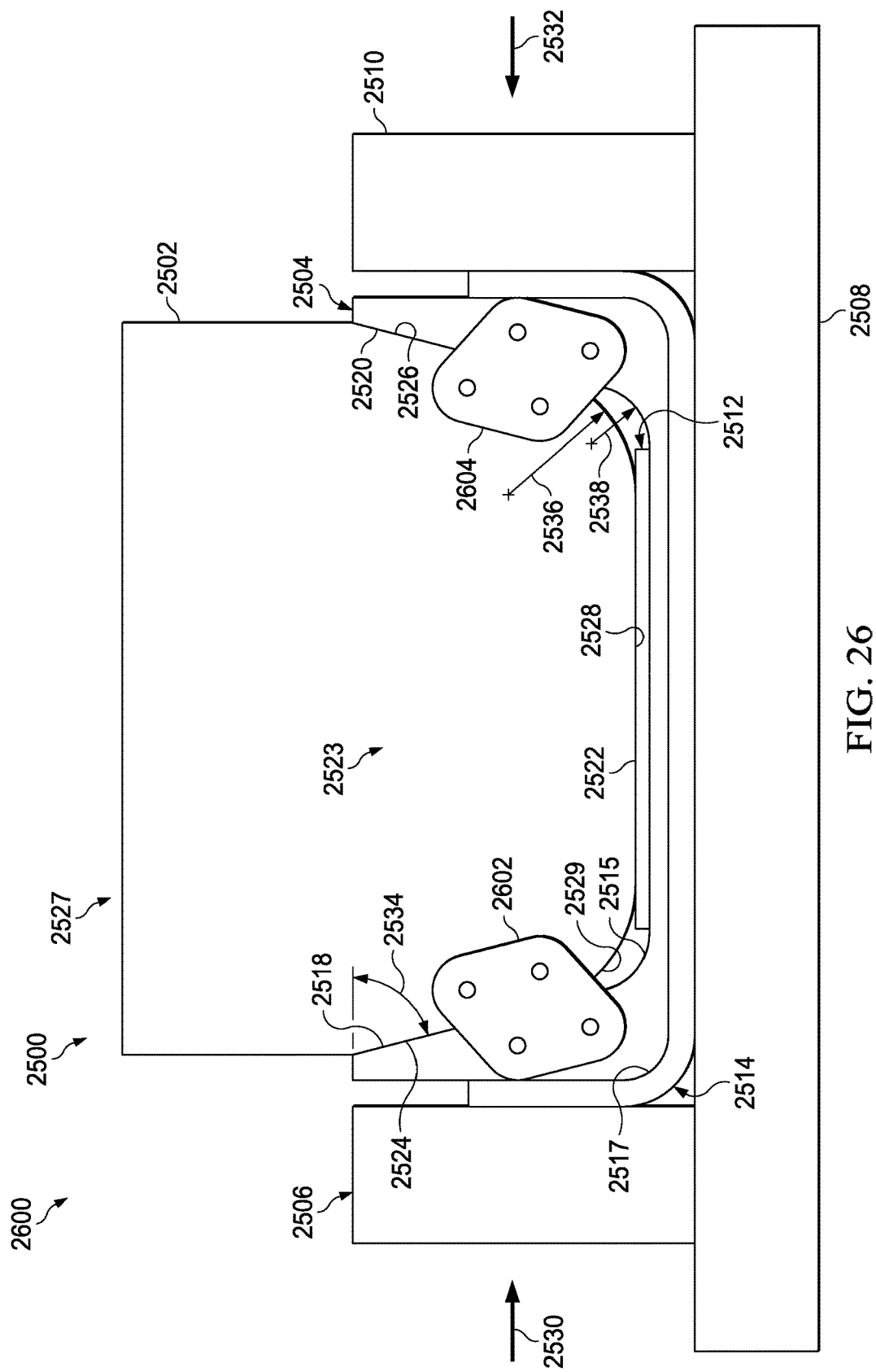
FIG. 26 is an illustration of a front view of an inclined sleeve in a continuous compression molding machine in accordance with an illustrative embodiment.

Turning now to FIG. 26, an illustration of a front view of an inclined sleeve in a continuous compression molding machine is depicted in accordance with an illustrative embodiment. Continuous compression molding environment 2600 may be a simplified view within a continuous compression molding machine.

As depicted, continuous compression molding environment 2600 includes the components of continuous compression molding environment 2500. However, as depicted, inclined sleeve 2504 is secured to inclined die 2502.

As depicted, connector 2602 and connector 2604 may be two of a number of connectors that may hold inclined sleeve 2504 in place relative to inclined die 2502. In this illustrative example, composite material moves into the page to travel through the continuous compression molding machine. In other words, inclined sleeve 2504 may be installed into continuous compression molding machine by connecting inclined sleeve 2504 to inclined die 2502 prior to forming composite material 2514. Inclined sleeve 2504 may stay in substantially the same location relative to inclined die 2502 during forming of composite material 2514.

Figure 27:
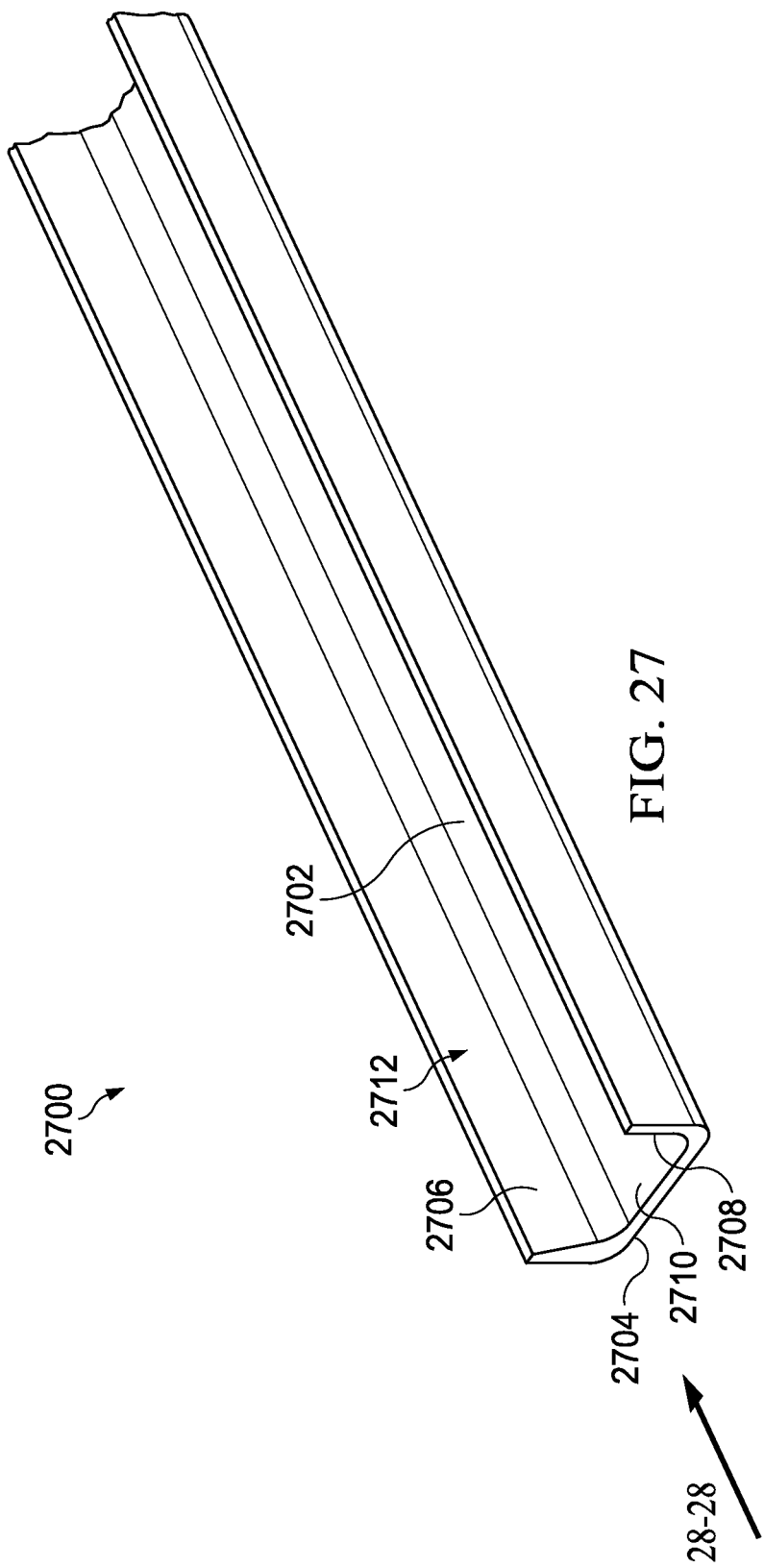
FIG. 27 is an illustration of an isometric view of an inclined sleeve in accordance with an illustrative embodiment.

Turning now to FIG. 27, an illustration of an isometric view of an inclined sleeve is depicted in accordance with an illustrative embodiment. Inclined sleeve 2700 may also be referred to as a tooling channel. Inclined sleeve 2700 may be used with associated tooling similar to U-shaped tooling channels 86 of FIG. 5.

Inclined sleeve 2700 may have first face 2702 and second face 2704. Second face 2704 may have features to mold a composite material. First face 2702 may have first inclined surface 2706, surface 2708, and substantially planar surface 2710. As depicted, substantially planar surface 2710 may be positioned between first inclined surface 2706 and surface 2708.

First face 2702 may form cavity 2712. Cavity 2712 may receive a die (not depicted). The die may have its own respective inclined surface. First inclined surface 2706 may substantially conform to a portion of the inclined die.

To form a composite material, inclined sleeve 2700 may be positioned between the die and the composite material. In these illustrative examples, first face 2702 may engage the die while second face 2704 may contact the composite material.

Figure 28:
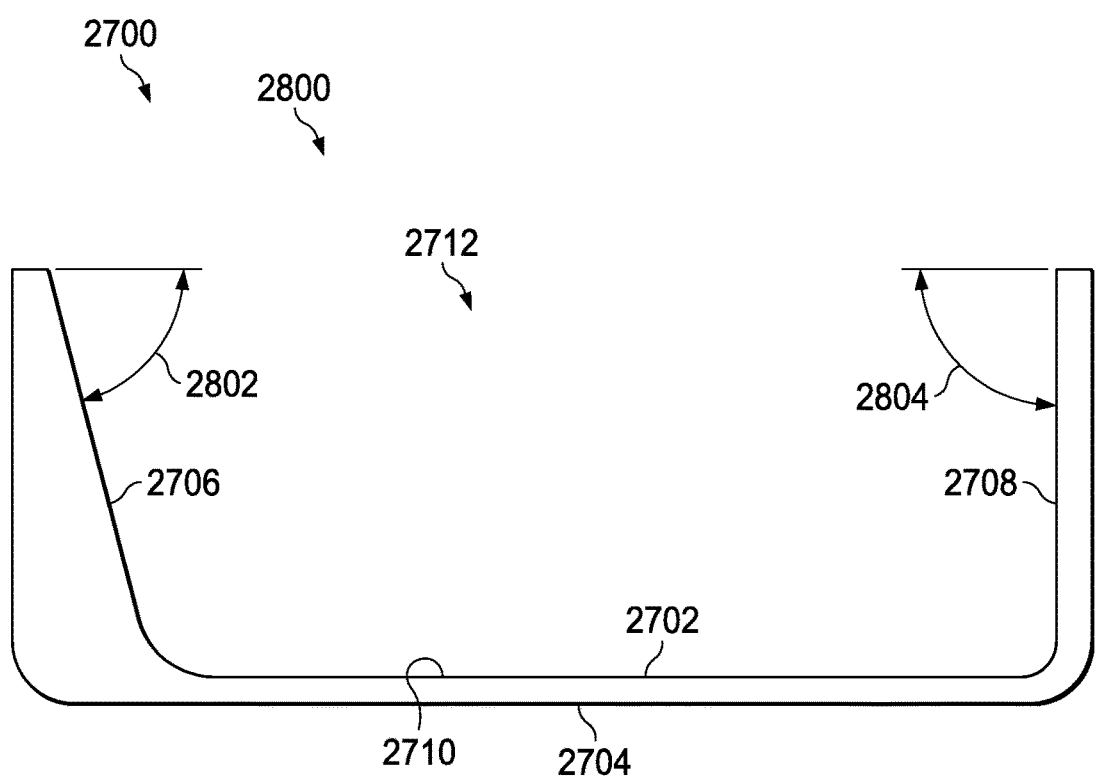
FIG. 28 is an illustration of a front view of an inclined sleeve in accordance with an illustrative embodiment.

Turning now to FIG. 28, an illustration of a front view of an inclined sleeve is depicted in accordance with an illustrative embodiment. View 2800 may be a view of inclined sleeve 2700 from direction 28-28 of FIG. 27. First inclined surface 2706 may be positioned at angle 2802 relative to substantially planar surface 2710. Surface 2708 may be positioned at angle 2804 relative to substantially planar surface 2710. As depicted, angle 2802 and angle 2804 are different from each other. As depicted, angle 2804 is about 90 degrees relative to substantially planar surface 2710.

As depicted, angle 2802 may be about 75 degrees. However, angle 2802 may be any desirable angle within greater than about 0 degrees and less than about 90 degrees. Angle 2802 may be selected based on at least one of an angle of an inclined surface of an inclined die, manufacturing tolerances, material properties of the material of inclined sleeve 2700, or other desirable information. For example, angle 2802 may be selected such that undesirable heat transfer properties due to the thickness of material of inclined sleeve 2700 are reduced. For example, reducing angle 2802 may increase the thickness of material of inclined sleeve 2700. As used herein, reducing angle 2802 may cause angle 2802 to approach 0 degrees. With increased thickness of inclined sleeve 2700, inclined sleeve 2700 may take longer to heat and cool. As a result, heat transfer properties may become more undesirable as angle 2802 decreases.

As another example, angle 2802 may be selected such that the weight of inclined sleeve 2700 is not undesirably high. For example, reducing angle 2802 may increase the thickness of material of inclined sleeve 2700. Increasing the thickness of the material of inclined sleeve 2700 may also increase the weight of inclined sleeve 2700.

The illustrations of inclined sleeves depictions, composite material depictions, and inclined die depictions in FIGS. 19-28 are not meant to imply physical or architectural limitations to the manner in which an illustrative embodiment may be implemented. Other components in addition to or in place of the ones illustrated may be used. Some components may be unnecessary. For example, angle 2534 may be greater than or less than 75 degrees. Angle 2534 may be any desirable angle greater than about 0 degrees and less than about 90 degrees. As a further example, angle 2002 may be different than angle 2004.

As yet a further example, one of angle 2002 and angle 2004 may be about 90 degrees. As a result, inclined sleeve 1900 may only have one inclined surface rather than two inclined surfaces. In this example, one of first inclined surface 1906 and second inclined surface 1908 may not be referred to as an "inclined" surface. For example, when angle 2004 is about 90 degrees, item 1908 may instead be referred to as simply a surface. As another example, when angle 2002 is about 90 degrees, item 1906 may instead be referred to as simply a surface.

As another example, rather than connector 2602 and connector 2604, inclined sleeve 2504 may have a front face and a back face such that inclined die 2502 securely fits within first face 2515, contacting the front face and the back face. In this example, the snug fit of inclined die 2502 within inclined sleeve 2504 may hold inclined sleeve 2504 in place. Further, attachment mechanisms such as screws, bolts, pins, or other desirable attachment mechanisms may be inserted into inclined die 2502 and inclined sleeve 2504 to further secure inclined sleeve 2504 to inclined die 2502.

Figure 29:
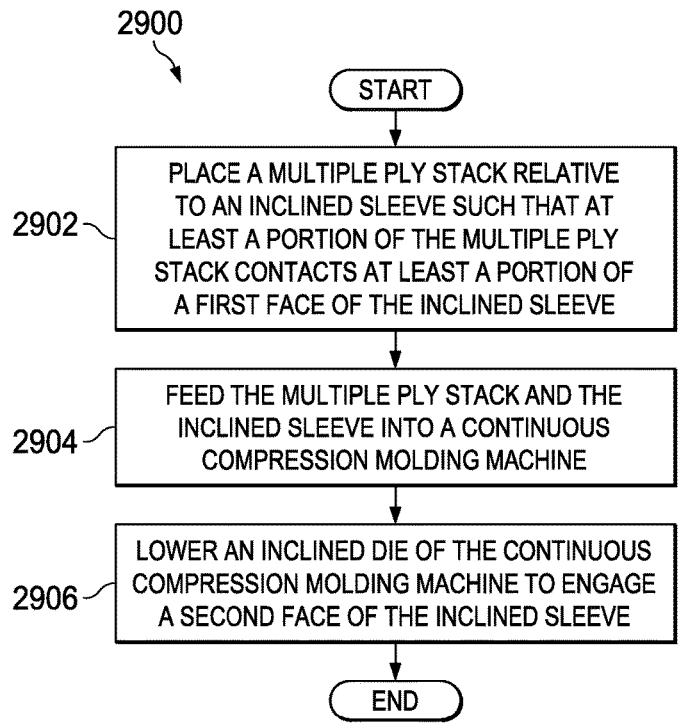
FIG. 29 is an illustration of a flowchart of a process for forming a composite part in accordance with an illustrative embodiment.

Turning now to FIG. 29, an illustration of a flowchart of a process for forming a composite part is depicted in accordance with an illustrative embodiment. Process 2900 may use an inclined sleeve such as inclined sleeve 1900 of FIGS. 19 and 20, inclined sleeve 2200 of FIG. 22, or inclined sleeve 2700 of FIGS. 27 and 28. Process 2900 may be used to form a composite part such thermoplastic composite laminate floor beam 20 of FIG. 1.

Process 2900 may begin by placing a multiple ply stack 2514 relative to a inclined sleeve 2504 such that at least a portion of the multiple ply stack 2514 contacts at least a portion of a first face 2517 of the inclined sleeve 2504 (operation 2902). The multiple ply stack may have a number of features that change a thickness of the multiple ply stack such as ramp ups, ramp downs, ply additions, ply subtractions, or other desirable features. In some illustrative examples, only a fraction of a first surface of the multiple ply stack may first contact a portion of the first face at first. In these illustrative examples, the remainder of the first surface of the multiple ply stack may be pressed against the first face of the inclined sleeve by other associated tooling.

Process 2900 may also feed the multiple ply stack 2514 and the inclined sleeve 2504 into a continuous compression molding machine (operation 2904). The continuous compression molding machine may have a number of inclined dies. An inclined die of the number of inclined dies may also be referred to as a continuous compression molding die.

Process 2900 may also lower an inclined die 2502 of the continuous compression molding machine to engage a second face 2515 of the inclined sleeve 2504 (operation 2906). Afterwards, process 2900 terminates.

Prior to lowering the inclined die, the second face of the inclined sleeve may be in engageable alignment with the inclined die. When the inclined sleeve is in engageable alignment with the inclined die, the inclined die may be lowered to contact the second face of the inclined sleeve.

In some illustrative examples, lowering the inclined die of the continuous compression molding machine to engage a second face of the inclined sleeve comprises lowering the inclined die such that a first inclined surface and a second inclined surface of the inclined die contacts a third inclined surface and a fourth inclined surface of the inclined sleeve. In these illustrative examples, the first inclined surface and the third inclined surface may have the same angle. In these illustrative examples, the second inclined surface and the fourth inclined surface may have the same angle. In some illustrative examples, each of the first inclined surface, the second inclined surface, the third inclined surface, and the fourth inclined surface may have the same angle. In some illustrative examples, the angle of the first inclined surface and the third inclined surface may be different than the angle of the second inclined surface and the fourth inclined surface.

Figure 30:
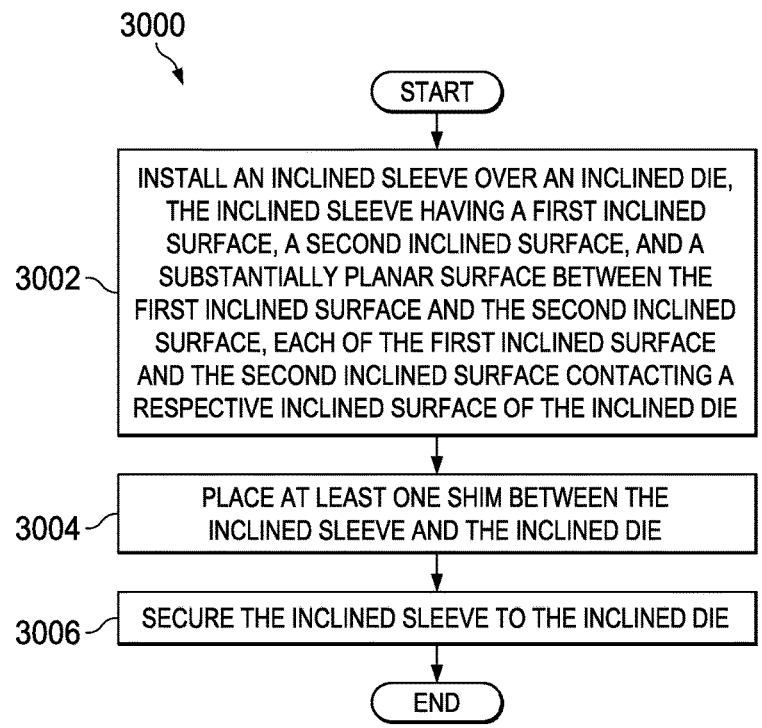
FIG. 30 is an illustration of a flowchart of a process for forming a composite part in accordance with an illustrative embodiment.

Turning now to FIG. 30, an illustration of a flowchart of a process for forming a composite part is depicted in accordance with an illustrative embodiment. Process 3000 may use an inclined sleeve such as inclined sleeve 1900 of FIGS. 19 and 20, inclined sleeve 2200 of FIG. 22, or inclined sleeve 2700 of FIGS. 27 and 28. Process 3000 may be used to form a composite part such thermoplastic composite laminate floor beam 20 of FIG. 1.

Process 3000 may begin by installing an inclined sleeve 2504 over a inclined die 2502, the inclined sleeve 2504 having a first inclined surface 2518, a second inclined surface 2520, and a substantially planar surface 2522 between the first inclined surface 2518 and the second inclined surface 2520, each of the first inclined surface 2518 and the second inclined surface 2520 contacting a respective inclined surface of the inclined die 2502 (operation 3002). In some illustrative examples, the cross-section of the inclined sleeve may be constant. In some illustrative examples, the cross-section of the inclined sleeve may vary across the length of the inclined sleeve. For example, the cross-section of the inclined sleeve may vary over its length if the incline sleeve has surface features which correspond to a number of ply additions, ply drops, ramp ups, ramp downs, or other features of a composite part.

Process 3000 may then place at least one shim 2512 between the inclined sleeve 2504 and the inclined die 2502 (operation 3004). The shim may allow for even pressure to be imparted to a composite material by the inclined die and the inclined sleeve. The shim may compensate for manufacturing tolerances or other inconsistencies in the inclined sleeve.

Process 3000 may then secure the inclined sleeve 2504 to the inclined die 2502 (operation 3006). By securing the inclined sleeve to the inclined die, the shape of a forming surface for a composite material may be changed. By securing the inclined sleeve to the inclined die, a composite material may be fed through a continuous compression molding machine and formed by the inclined sleeve. The inclined sleeve may remain in substantially the location relative to the inclined die.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

Figure 31:
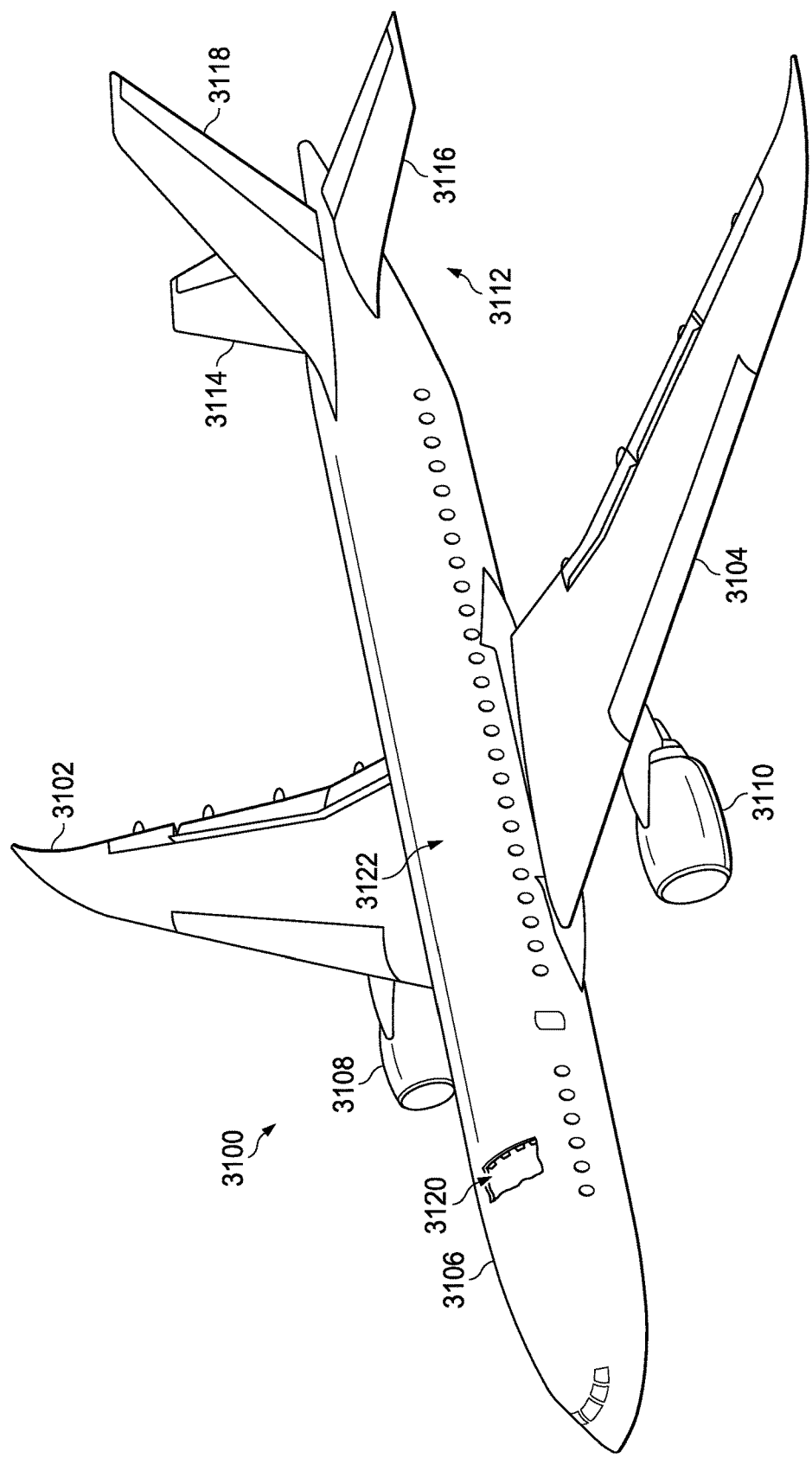
FIG. 31 is an illustration of an aircraft in accordance with an illustrative embodiment.

Turning now to FIG. 31, an illustration of an aircraft is depicted in accordance with an illustrative embodiment. In this illustrative example, aircraft 3100 has wing 3102 and wing 3104 attached to body 3106. Aircraft 3100 includes engine 3108 attached to wing 3102 and engine 3110 attached to wing 3104.

Body 3106 has tail section 3112. Horizontal stabilizer 3114, horizontal stabilizer 3116, and vertical stabilizer 3118 are attached to tail section 3112 of body 3106.

Aircraft 3100 is an example of an aircraft in which a composite part formed using an inclined sleeve may be implemented in accordance with an illustrative embodiment. For example, stiffeners 3120 contacting composite skin 3122 of aircraft 3100 may be formed using an inclined sleeve. FIG. 31 depicts an exposed view of stiffeners 3120.

This illustration of aircraft 3100 is provided for purposes of illustrating one environment in which the different illustrative embodiments may be implemented. The illustration of aircraft 3100 in FIG. 31 is not meant to imply architectural limitations to the manner in which different illustrative embodiments may be implemented. For example, aircraft 3100 is shown as a commercial passenger aircraft. The different illustrative embodiments may be applied to other types of aircraft, such as private passenger aircraft, a rotorcraft, and other suitable types of aircraft.

The illustrative embodiments of the disclosure may be described in the context of aircraft manufacturing and service method 3200 as shown in FIG. 32 and aircraft 3320 as shown in FIG. 33. Turning first to FIG. 32, an illustration of a block diagram of an aircraft manufacturing and service method is depicted in accordance with an illustrative embodiment. During pre-production, aircraft manufacturing and service method 3200 may include specification and design 3202 of aircraft 3320 in FIG. 33 and material procurement 3204.

During production, component and subassembly manufacturing 3206 and system integration 3208 of aircraft 3320 in FIG. 33 takes place. Thereafter, aircraft 3320 in FIG. 33 may go through certification and delivery 3210 in order to be placed in service 3212. While in service 3212 by a customer, aircraft 3320 in FIG. 33 is scheduled for routine maintenance and service 3214, which may include modification, reconfiguration, refurbishment, and other maintenance or service.

Each of the processes of aircraft manufacturing and service method 3200 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 33, an illustration of a block diagram of an aircraft is depicted in which an illustrative embodiment may be implemented. In this example, aircraft 3320 is produced by aircraft manufacturing and service method 3200 in FIG. 32 and may include airframe 3322 with plurality of systems 3324 and interior 3326. Examples of systems 3324 include one or more of propulsion system 3328, electrical system 3310, hydraulic system 3312, and environmental system 3314. Any number of other systems may be included. Although an aerospace example is shown, different illustrative embodiments may be applied to other industries, such as the automotive industry. The apparatuses and methods embodied herein may be employed during at least one of the stages of aircraft manufacturing and service method 3200 in FIG. 32.

One or more illustrative embodiments may be used during component and subassembly manufacturing 3206. For example, inclined sleeve 1900 may be used to form a composite structure during component and subassembly manufacturing 3206. Further, a composite structure formed by inclined sleeve 1900 may also be used to replace a composite filler during maintenance and service 3214.

The illustrative embodiments provide a system and method for forming a composite part using an inclined sleeve. The inclined surfaces of the inclined sleeve engage inclined surfaces of an inclined die. By having inclined surfaces, inconsistencies due to manufacturing tolerances or other inconsistencies of the inclined sleeve or the inclined die may not influence the application of pressure to a composite material. Specifically, by having inclined surfaces, inconsistencies may be concentrated between a substantially planar surface of the inclined die and a substantially planar surface of the inclined sleeve. A shim may be placed between a substantially planar surface of the inclined die and a substantially planar surface of the inclined sleeve to compensate for these inconsistencies. Further, the respective inclined surfaces may cause the inclined die to be self-locating.

The inclined sleeve and inclined die may reduce product inconsistencies such as porosity in resulting composite parts following forming. By supplying even pressure to a composite material, resulting composite parts may have desirable quality.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
   a sleeve located between an inclined die and a composite material that molds the composite material, the sleeve having a first sleeve face and a second sleeve face, wherein the second sleeve face forms an exterior surface of the sleeve and the first sleeve face forms an interior surface of the sleeve, the second sleeve face having features to mold the composite material, the first sleeve face comprising:
      a first inclined surface of the first sleeve face, the first inclined surface having an angle greater than about 90 degrees relative to a substantially planar surface of the second sleeve face, the substantially planar surface being opposite a first sleeve surface of the first sleeve face, wherein the first inclined surface contacts the inclined die;
   the inclined die having a first die face; and
   a shim positioned between the first die face and the first sleeve face; and
   a number of substantially rhombus-shaped connectors holding the sleeve in place relative to the inclined die by connecting the inclined sleeve to the inclined die.

2. The apparatus of claim 1, the first sleeve face further comprising:
   a second inclined surface of a third face extending from the first sleeve surface, the second inclined surface having an angle greater than about 90 degrees, wherein the second inclined surface contacts the inclined die.

3. The apparatus of claim 2, wherein the first inclined surface substantially conforms to a portion of the inclined die, and wherein the second inclined surface substantially conforms to a second portion of the inclined die.

4. The apparatus of claim 3, wherein the first sleeve surface is substantially planar.

5. The apparatus of claim 4 wherein the
   shim is in contact with at least a portion of the first sleeve surface.

6. The apparatus of claim 3 further comprising:
   the inclined die having a third inclined surface, a fourth inclined surface, wherein the first die face is positioned between the third inclined surface and the fourth inclined surface.

7. The apparatus of claim 1, wherein the first sleeve face forms a cavity that receives the inclined die.

8. An apparatus comprising:
   an inclined die having a first die face;
   an inclined sleeve located between the inclined die and a composite charge having a first sleeve face in engageable alignment with the inclined die, wherein the first sleeve face forms an interior wall of the inclined sleeve;
   the first sleeve face comprising:
      a first inclined surface having an angle greater than about 90 degrees relative to a substantially planar surface of a second sleeve face, wherein the first inclined surface contacts the inclined die;
      a second inclined surface having an angle greater than about 90 degrees, relative to the substantially planar surface of the second sleeve face wherein the second inclined surface contacts the inclined die;
   wherein the second sleeve face forms an exterior surface of the inclined sleeve and, wherein the second sleeve face contacts the composite charge; and
   a shim positioned between the first die face and the first sleeve face of the inclined sleeve; and
   a number of substantially rhombus-shaped connectors holding the inclined sleeve in place relative to the inclined die by connecting the inclined sleeve to the inclined die.

9. The apparatus of claim 8, wherein the shim is positioned between a substantially planar surface of the first sleeve face and a second substantially planar surface of the first die face.

10. The apparatus of claim 8, wherein a second die face comprises a third inclined surface having an angle greater than 90 degrees.

11. The apparatus of claim 10, wherein at least a portion of the third inclined surface engages at least a portion of the first inclined surface.

12. The apparatus of claim 8, wherein the shim contacts at least a portion of a substantially planar surface of the first sleeve face and at least a portion of a second substantially planar surface of the first die face.

13. An apparatus comprising:
   a sleeve located between a continuous compression molding die and a composite charge, the sleeve having a first sleeve face and a second sleeve face, wherein the first sleeve face forms a cavity and, wherein the first sleeve face forms an interior surface of the sleeve and the second sleeve face forms an exterior surface of the sleeve, the second sleeve face comprising:
      a surface of the second sleeve face, the surface being opposite the first sleeve face, wherein the second sleeve face contacts the composite charge;
   the first sleeve face comprising:
      a first inclined surface of the first sleeve face, the first inclined surface having an angle greater than about 90 degrees relative to the surface of the second sleeve face, wherein the first inclined surface contacts the continuous compression molding die; and
      a second sleeve surface that is generally planar;
   the continuous compression molding die having a first face; and
   a shim positioned between the first face of the continuous compression molding die and the first sleeve face; and
   a number of substantially rhombus-shaped connectors holding the sleeve in place relative to the inclined die by connecting the sleeve to the inclined die.

14. The apparatus of claim 13, the first sleeve face further comprising:
   a third face extending from the second sleeve surface, the third face having a third inclined surface having an angle greater than about 90 degrees, wherein the third inclined surface contacts the continuous compression molding die.

15. The apparatus of claim 14 further comprising:
   the continuous compression molding die comprising a second inclined surface conforming to the first inclined surface, a fourth inclined surface conforming to the third inclined surface, and a substantially planar surface between the respective inclined surfaces.

16. The apparatus of claim 1, wherein along a first axis, a width of the sleeve along a second axis varies from an initial width to a second width smaller than the initial width, and then to a third width greater than the second width.

17. The apparatus of claim 16, wherein the initial width equals the third width.

18. The apparatus of claim 17, wherein the initial width tapers down to the second width along the first axis, and wherein the second width tapers back up to the third width.

19. The apparatus of claim 7, wherein the number of connectors comprises two connectors, and wherein a first connector connects the inclined die to the first inclined surface and wherein a second connector connects the inclined die to the second inclined surface.

20. The apparatus of claim 1, wherein a first portion of the composite material is located between the second sleeve face and a first tooling member and a second portion of the composite material is located between the second sleeve face and a second tooling member.

\* \* \* \* \*